US012779860B2

(12) United States Patent
Kusano et al.

(10) Patent No.: US 12,779,860 B2
(45) Date of Patent: Nov. 3, 2026

(54) CARTRIDGE AND REUSING METHOD OF CARTRIDGE

(71) Applicant: CANON KABUSHIKI KAISHA, Tokyo (JP)

(72) Inventors: Hiroaki Kusano, Tokyo (JP); Satoru Takahashi, Kanagawa (JP); Narumi Shinohara, Kanagawa (JP); Yusuke Hashimoto, Kanagawa (JP); Motoaki Sato, Tokyo (JP); Junichiro Iri, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 174 days.

(21) Appl. No.: 18/632,084

(22) Filed: Apr. 10, 2024

(65) Prior Publication Data

US 2024/0343042 A1 Oct. 17, 2024

(30) Foreign Application Priority Data

Apr. 14, 2023 (JP) ................................ 2023-066436
Mar. 1, 2024 (JP) ................................ 2024-031412

(51) Int. Cl.
*B41J 2/175* (2006.01)

(52) U.S. Cl.
CPC ....... *B41J 2/17513* (2013.01); *B41J 2/17506* (2013.01); *B41J 2/17553* (2013.01); *B41J 2/17559* (2013.01)

(58) Field of Classification Search
CPC .......................... B41J 2/17559; B41J 2/17503
See application file for complete search history.

(56) References Cited

U.S. PATENT DOCUMENTS

| | | | | |
|---|---|---|---|---|
| 6,161,927 A | 12/2000 | Long | | |
| 7,384,137 B2 | 6/2008 | Putman | | |
| 7,488,061 B2 | 2/2009 | Putman | | |
| 2001/0046400 A1* | 11/2001 | Hill | B41J 2/17513 | 400/207 |
| 2003/0058315 A1 | 3/2003 | Lee | | |
| 2007/0242114 A1* | 10/2007 | Kubota | B41J 2/17559 | 347/86 |

(Continued)

FOREIGN PATENT DOCUMENTS

| | | | |
|---|---|---|---|
| JP | 2009248427 A | 10/2009 | |
| WO | 2008101380 A1 | 8/2008 | |
| WO | WO-2019012786 A1 * | 1/2019 | B41J 2/17566 |

*Primary Examiner* — Sharon Polk
(74) *Attorney, Agent, or Firm* — Canon U.S.A., Inc. IP Division

(57) ABSTRACT

Provided is a cartridge including: an absorbent; a tank including an absorbent holder configured to accommodate the absorbent; a lid member joined to the tank; and a partition member arranged between the lid member and the absorbent located in the absorbent holder. In the cartridge, the lid member includes a first engagement portion, the partition member includes a second engagement portion, the first engagement portion and the second engagement portion are engaged with each other, and parts of outer peripheries of surfaces of the lid member and the partition member facing each other have an interval therebetween in an overlapping direction in which the lid member and the partition member overlap each other.

18 Claims, 24 Drawing Sheets

(56) References Cited

U.S. PATENT DOCUMENTS

| | | | | |
|---|---|---|---|---|
| 2009/0219337 | A1* | 9/2009 | Harada | B41J 2/185 347/36 |
| 2024/0343040 | A1* | 10/2024 | Otani | B41J 2/17553 |
| 2024/0343044 | A1* | 10/2024 | Kondo | B41J 2/17513 |

* cited by examiner

CARTRIDGE AND REUSING METHOD OF CARTRIDGE

BACKGROUND OF THE INVENTION

Field of the Invention

The present disclosure relates to a cartridge and a reusing method of the cartridge.

Description of the Related Art

In recent years, regulations aimed at environment protection are increasing, and printing devices are required to correspond to reusable products. Japanese Patent Laid-Open No. 2009-248427 (hereinafter, referred to as Literature 1) discloses a configuration that includes a lid and an ink tank forming an inkjet cartridge and in which a welding rib between the lid and the ink tank is melted and welded by vibration welding.

In the case where the ink tank and the lid are welded and fixed as in Literature 1, welding surfaces of the ink tank and the lid are melted and deformed. Accordingly, it is difficult to disassemble the ink tank and the lid after the usage of the cartridge and reuse the ink tank and the lid.

SUMMARY OF THE INVENTION

A cartridge of the present disclosure includes: an absorbent configured to hold liquid; a tank including an opening and an absorbent holder configured to accommodate the absorbent; a lid member joined to the opening of the tank; and a partition member arranged between the lid member and the absorbent located in the absorbent holder. In the cartridge, the lid member includes a first engagement portion, the partition member includes a second engagement portion, the first engagement portion and the second engagement portion are engaged with each other, and parts of outer peripheries of surfaces of the lid member and the partition member facing each other have an interval therebetween in an overlapping direction in which the lid member and the partition member overlap each other.

Further features of the present invention will become apparent from the following description of exemplary embodiments with reference to the attached drawings.

DESCRIPTION OF THE EMBODIMENTS

Embodiments of the present disclosure are explained below in detail with reference to the drawings.

First Embodiment

Outline of Inkjet Printing apparatus

Figure 1:
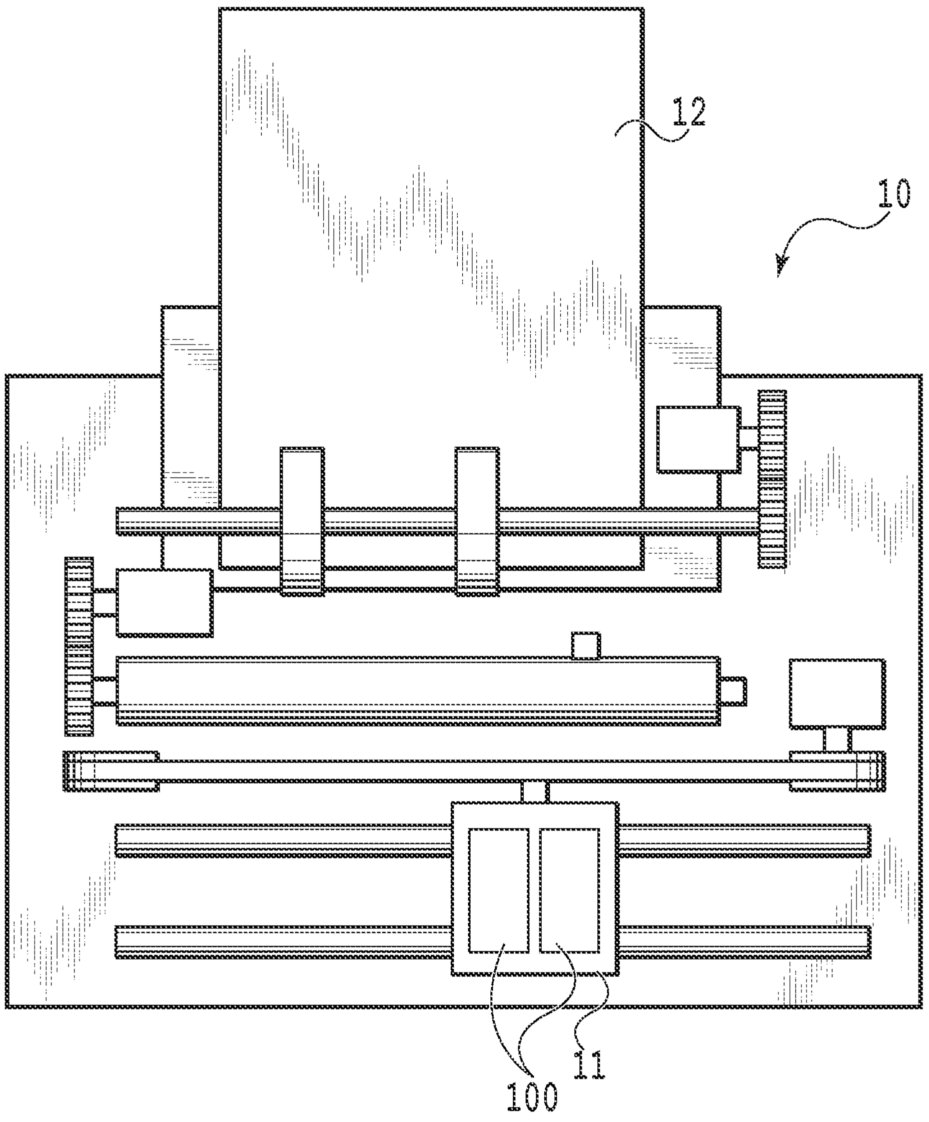
FIG. 1 is a schematic diagram of a printing apparatus in which a cartridge of the present disclosure is usable.

FIG. 1 illustrates a schematic diagram of an inkjet printing apparatus according to a first embodiment. The inkjet printing apparatus 10 (hereinafter, also referred to as printing apparatus) is an on-carriage type printing apparatus using a serial printing method, and includes a cartridge 100 and a carriage 11. The cartridge 100 is mounted in the carriage 11. In the printing apparatus 10, the carriage 11 is reciprocally moved, a print sheet 12 is conveyed by an increment of a predetermined amount in a direction orthogonal to the reciprocal movement of the carriage, and the cartridge ejects inks to the print sheet 12 to form an image on the print sheet 12.

Outline of Cartridge

Figure 2:
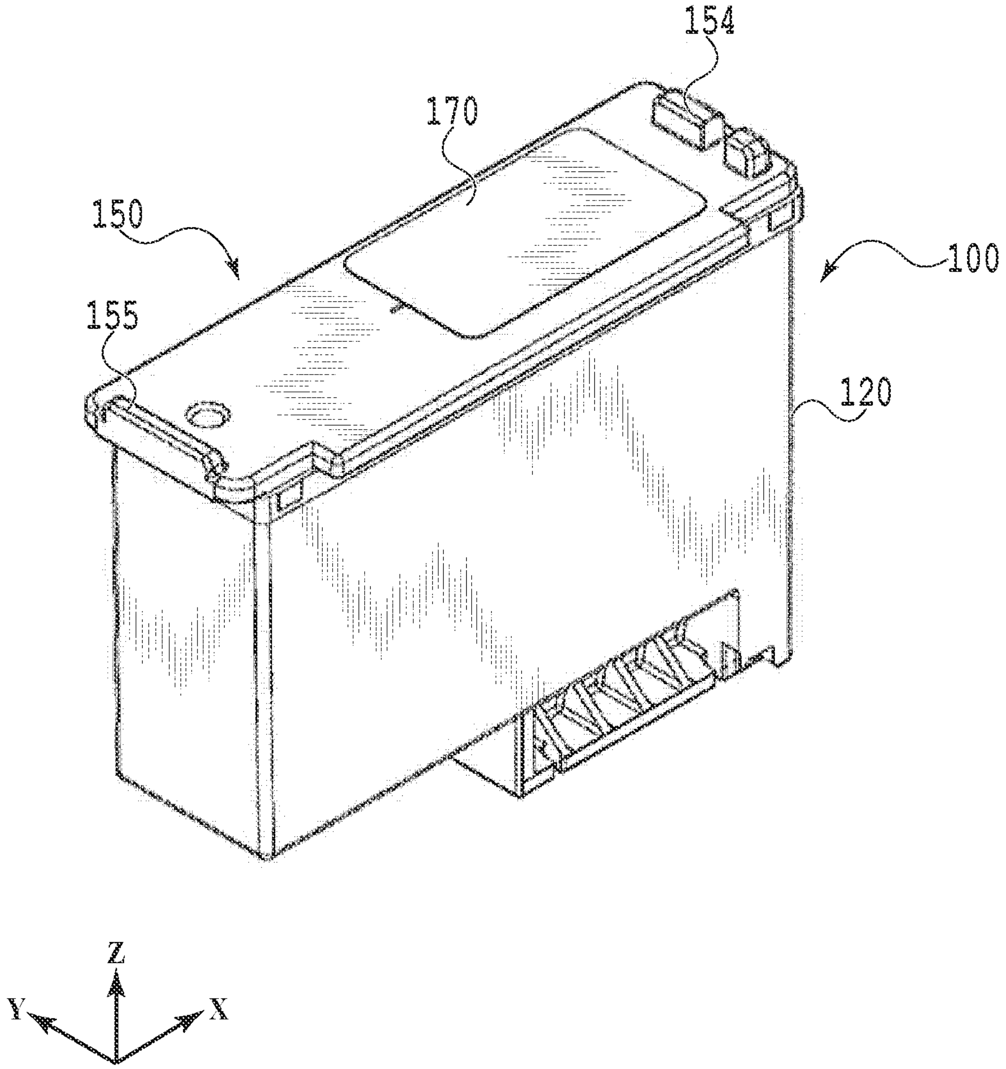
FIG. 2 is a perspective view illustrating an outer appearance of the cartridge according to a first embodiment.
Figure 3:
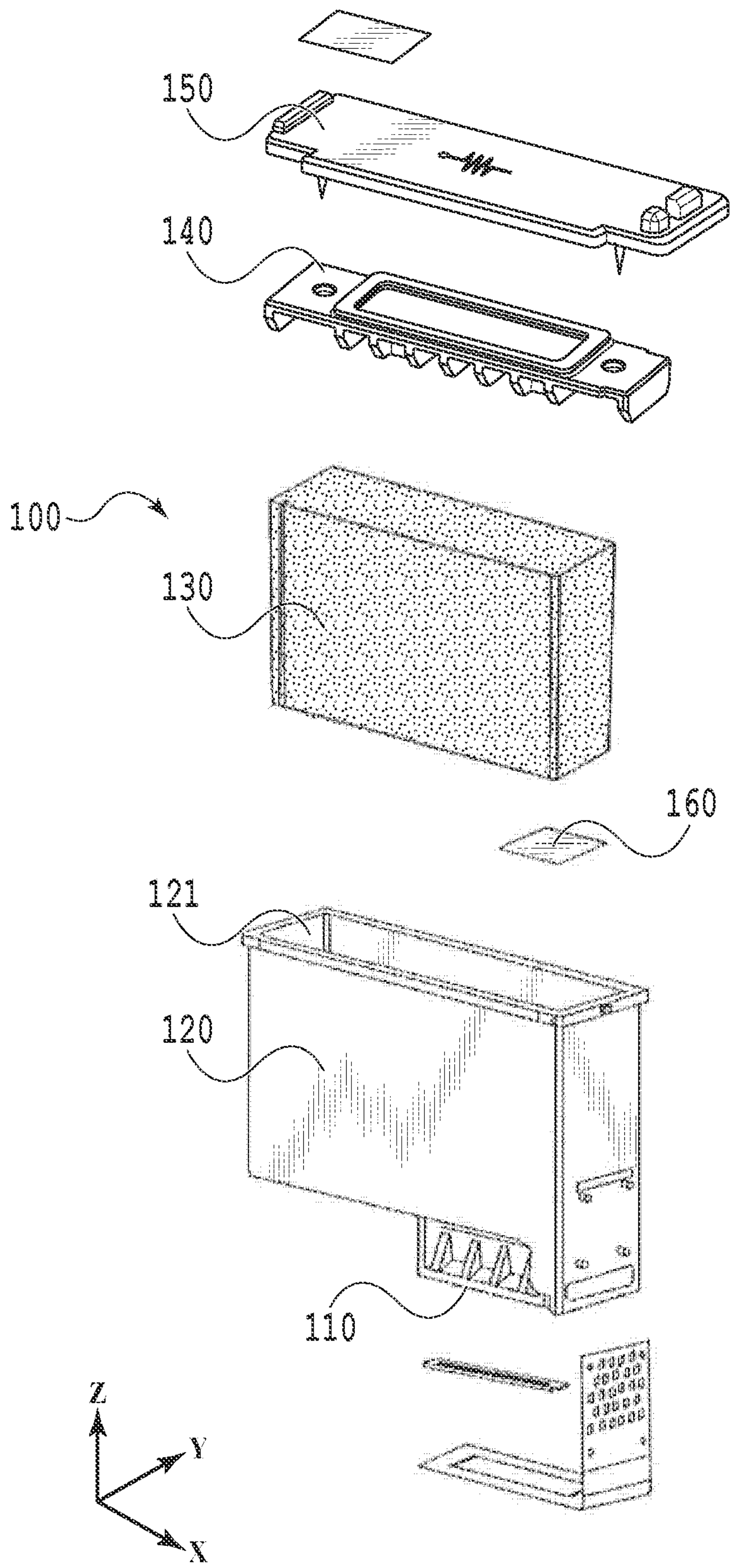
FIG. 3 is an exploded perspective view of the cartridge according to the first embodiment.

FIG. 2 illustrates a perspective view of the cartridge according to the first embodiment, and FIG. 3 illustrates an exploded perspective view of the cartridge according to the first embodiment. The cartridge 100 is a type of cartridge that stores an ink of one color therein, and is generally a cartridge for a black ink. The present disclosure can be applied also to a type of cartridge that stores inks of multiple colors, generally a cartridge for chromatic color inks (cyan, magenta, and yellow). However, in the present embodiment, explanation is given by using the cartridge for the black ink.

As illustrated in FIG. 3, the cartridge 100 includes a print head 110 configured to eject the ink, a tank 120 configured to store the ink, an absorbent 130 configured to absorb and hold liquid, a partition member 140 configured to press the absorbent 130, and a lid member 150 joined to the tank 120. The cartridge 100 includes a filter 160 configured to remove foreign substances in the tank 120. The print head 110 is configured to eject the ink based on ejection data, and is arranged on a bottom surface of the tank 120 on the lower side in the vertical direction. The absorbent 130 is formed of a fibrous body, a porous body, or the like, and can hold the ink therein by exhibiting capillary force. The absorbent 130 is accommodated in an absorbent holder 121 of the tank 120 to abut the filter 160 for removal of foreign substances.

The lid member 150 is arranged to block an opening of the tank 120, and sections the absorbent holder 121 together with the tank 120. The partition member 140 is arranged between the absorbent 130 and the lid member 150, and fixes and holds the absorbent 130. Details of the lid member 150 and the partition member 140 are described later.

Assembly Step

Figure 4A:
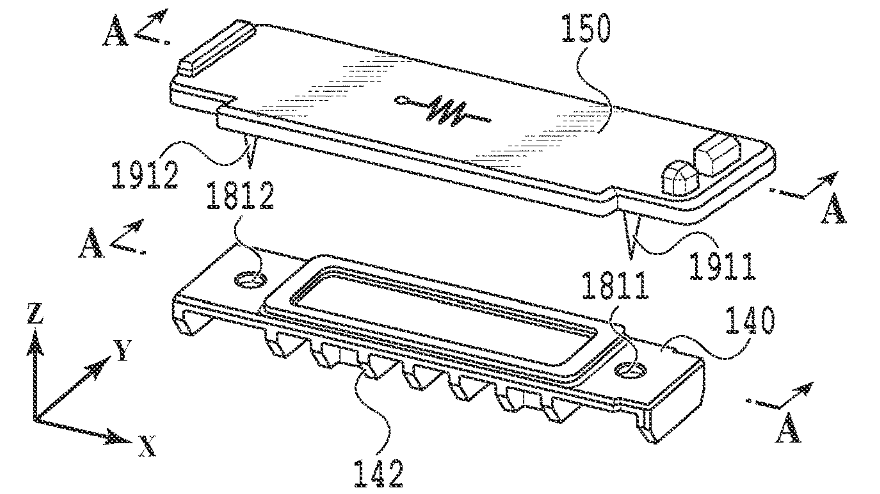
FIGS. 4A to 4D illustrate an assembly step of a lid member and a partition member according to the first embodiment.
Figure 4B:
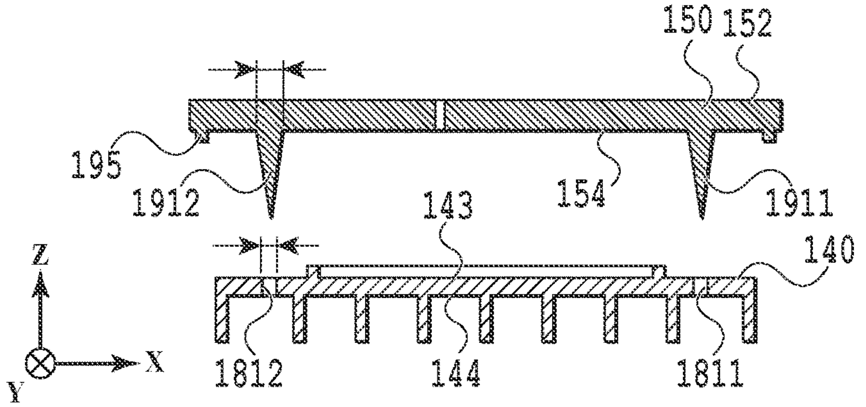
Figure 4C:
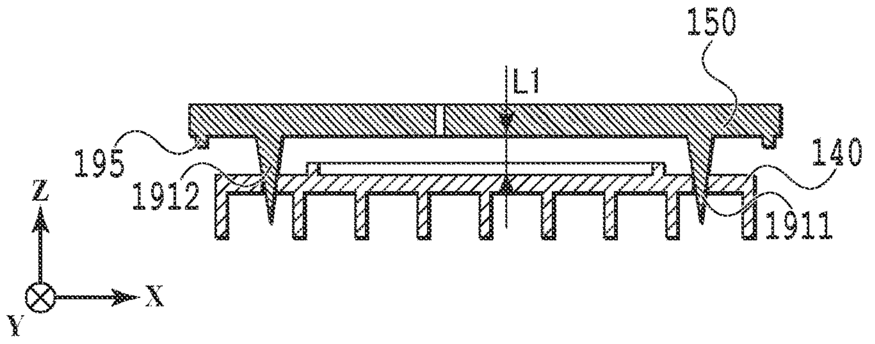
Figure 4D:
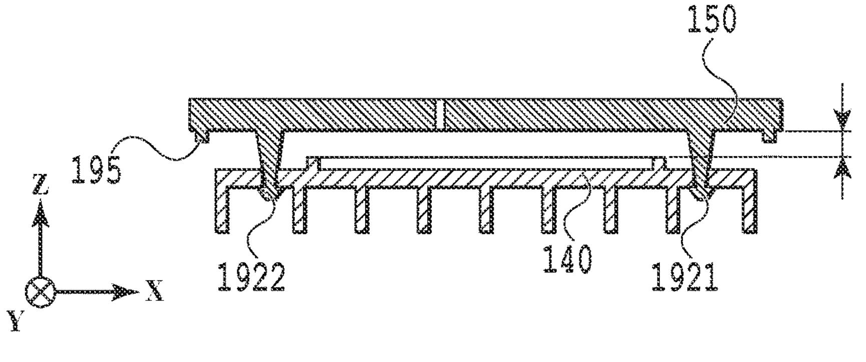

FIGS. 4A to 4D illustrate an assembly step of the lid member 150 and the partition member 140 in the cartridge according to the first embodiment. FIG. 4A is a perspective view illustrating outer appearances of the lid member 150 and the partition member 140. FIGS. 4B to 4D illustrate a cross section along the A-A line illustrated in FIG. 4A, and the assembly is performed in the order of FIG. 4B, FIG. 4C, and FIG. 4D.

As illustrated in FIG. 4B, the lid member 150 defines a plane on an XY plane, and defines a first surface 152 and a second surface 154. The lid member 150 includes a welding rib 195 and supporting columns 1911 and 1912 (first engagement portion) that protrude in a negative Z-axis direction from the second surface 154. Each of the supporting columns 1911 and 1912 extends from a portion (first position) proximal to the second surface 154 toward a portion (second position) distant from the second surface 154, and has a conical shape tapered toward a tip. In the first embodiment, the central axes of the supporting columns 1911 and 1912 are perpendicular to the lid member 150. However, the central axes may be tilted. The welding rib 195 may be an independent component, and is arranged between the lid member 150 and the tank 120 in the case where vibration welding is performed. Note that the negative Z-axis direction corresponds to the direction of gravity.

The partition member 140 defines a plane on the XY plane, and defines a first surface 143 and a second surface 144. The partition member 140 includes two holes 1811 and 1812 (second engagement portion) that penetrate the partition member 140 in the Z-axis direction. The inner diameter of the holes 1811 and 1812 is larger than the outer diameter of the supporting columns 1911 and 1912 in the distal portions, and is smaller than the outer diameter thereof in the proximal portions. The partition member 140 has dimensions smaller than those of a region defined by the welding rib 195 on the XY plane. The second surface 144 of the partition member 140 includes rib portions 142 that protrude in the negative Z-axis direction.

As illustrated in FIG. 4C, the supporting columns 1911 and 1912 of the lid member 150 are inserted into the holes 1811 and 1812 of the partition member 140, respectively. As described above, the inner diameter of the holes 1811 and 1812 is larger than the outer diameter of the supporting columns 1911 and 1912 at the second positions, and is smaller than the outer diameter thereof at the first positions. This suppresses further insertion of the supporting columns 1911 and 1912 into the holes 1811 and 1812 at the positions where the inner diameter of the holes 1811 and 1812 and the outer diameter of the supporting columns 1911 and 1912 match each other. In this case, an interval between the second surface 154 of the lid member 150 and the first surface 143 of the partition member 140 is interval L1. The interval L1 is within a range of 1.0 mm or more and 2.0 mm or less. The interval L1 facilitates separation of the lid member 150 and the partition member 140 in a separation step to be described later.

As illustrated in FIG. 4D, tips of the distal portions of the supporting columns 1911 and 1912 are heated and melted with the interval L1 maintained between the second surface 154 of the lid member 150 and the first surface 143 of the partition member 140. The melting forms fixing portions 1921 and 1922 having a larger outer diameter than the inner diameter of the holes 1811 and 1812. In the supporting columns 1911 and 1912, the proximal portions and the fixing portions 1921 and 1922 that have larger outer diameters than the inner diameter of the holes 1811 and 1812 cause the positions of the supporting columns 1911 and 1912 and the holes 1811 and 1812 to be fixed, and the lid member 150 is fixed to the partition member 140. The supporting columns 1911 and 1912 are not limited to a conical shape, and the holes 1811 and 1812 are not limited to a circular shape.

Vibration Welding Step

Figure 5A:
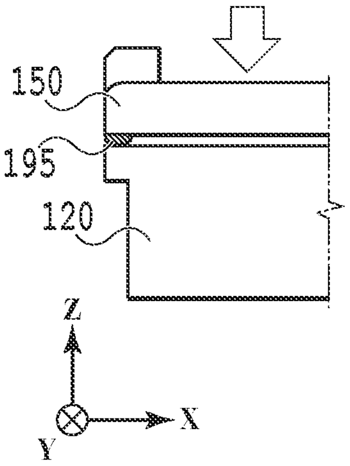
FIGS. 5A to 5C illustrate a vibration welding step of the lid member and a tank according to the first embodiment.
Figure 5B:
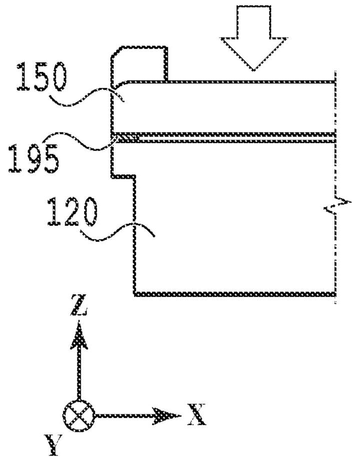
Figure 5C:
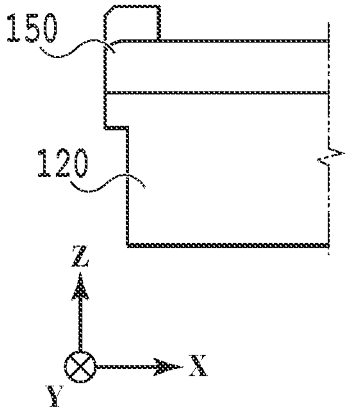

FIGS. 5A to 5C illustrate a vibration welding step of the tank 120 and the lid member 150 fixed to the partition member 140. The lid member 150 is arranged relative to the opening portion of the tank 120, the welding rib 195 of the lid member 150 is brought into contact with the opening portion of the tank 120, and the lid member 150 is vibrated while being pressed against the tank 120 at predetermined pressure. The vibration direction of the lid member 150 is an X-axis direction of the lid member 150. The amplitude of the vibration is within a range of 0.5 mm or more and 2.0 mm or less, and the frequency of the vibration is within a range of 200 Hz or more and 400 Hz or less. The lid member 150 is vibrated with respect to the tank 120 to generate friction heat in contact portions of the tank 120 and the welding rib 195 and cause the opening portion of the tank 120 and the welding rib 195 to melt, and the tank 120 and the lid member 150 are thereby coupled to each other.

Separation Step

The used cartridge 100 is collected by a collection trader or the like. The cartridge 100 is cleaned to remove soiling such as the ink, and is subjected to multiple quality inspections. The tank 120 and the lid member 150 of the cartridge 100 determined to be reusable are separated from each other, and the partition member 140 is reused.

Figure 6A:
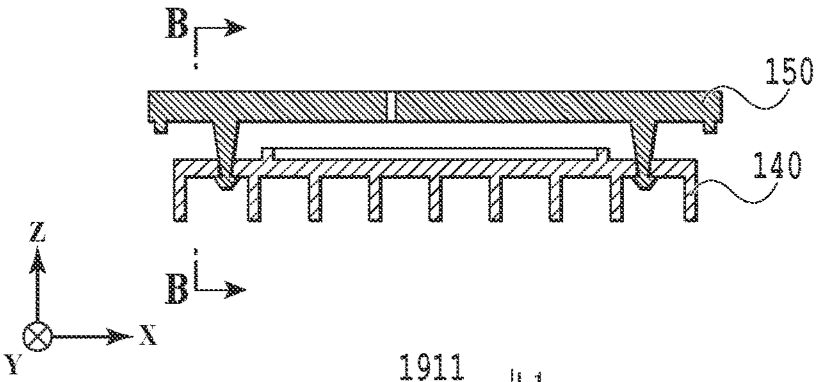
FIGS. 6A to 6E illustrate a separation step of the lid member and the partition member according to the first embodiment.
Figure 6B:
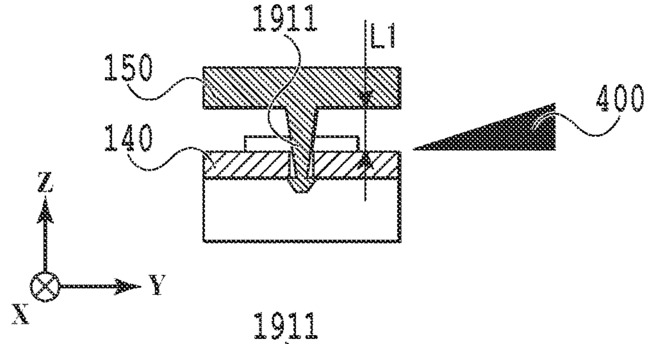
Figure 6C:
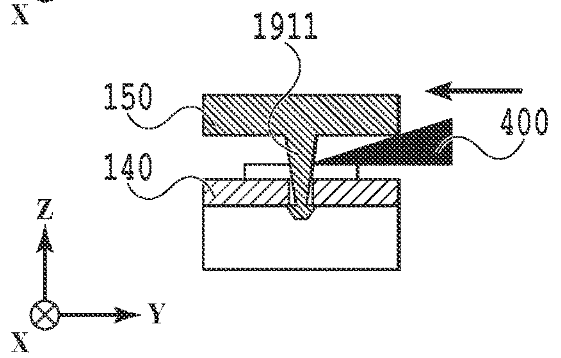

FIGS. 6A to 6E illustrate a step of separating the lid member 150 and the partition member 140 from each other according to the first embodiment. FIG. 6A illustrates a cross section of the lid member 150 and the partition member 140 separated from the tank 120. FIGS. 6B to 6E schematically illustrate a cross section along the B-B line in FIG. 6A, and the separation is performed in the order of FIG. 6B, FIG. 6C, FIG. 6D, and FIG. 6E. As illustrated in FIG. 6B, a tool 400 is inserted into the interval L1 between the lid member 150 and the partition member 140. The tool 400 has a tapered shape including a first portion with a larger width than the interval L1 and a second portion with a smaller width than the interval L1. As illustrated in FIG. 6C, the tool 400 is inserted between the lid member 150 and the partition member 140 until the tool 400 comes into contact with the lid member 150 and the partition member 140, that is until the width of an inserted portion of the tool 400 matches the interval L1.

Figure 6D:
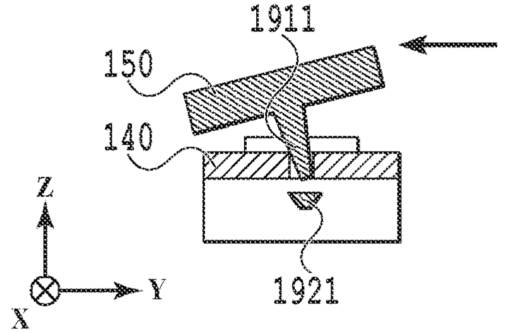

In the case where the tool 400 is further inserted between the lid member 150 and the partition member 140 as illustrated in FIG. 6D, stress is applied to the lid member 150 and the partition member 140 due to the tapered shape of the tool 400, and stress concertation occurs in a joining portion of the supporting column 1911 and the fixing portion 1921. The stress concentration causes the joining portion of the supporting column 1911 and the fixing portion 1921 to break, and the supporting column 1911 and the fixing portion 1921 are separated from each other. The supporting column 1912 and the fixing portion 1922 are also similarly separated, and the lid member 150 and the partition member 140 are thereby separated.

Figure 6E:
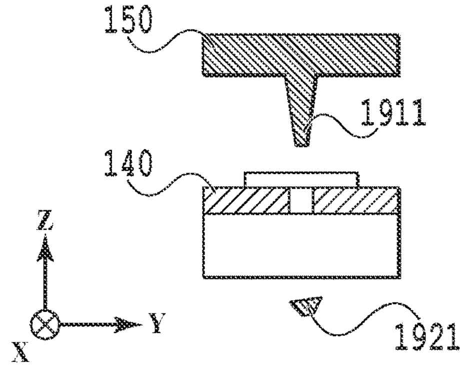

As illustrated in FIG. 6E, the partition member 140 is separated, and is reused to be incorporated in a next product. A method of reusing the partition member 140 includes a step of peeling off the lid member 150 from the tank 120, a step of separating the lid member 150 and the partition member 140 from each other, a step of replacing the absorbent 130, and a step of cleaning the inside of the tank 120. The method of reusing the partition member 140 includes a step of inserting a new absorbent 130 into the tank 120 and injecting liquid into the tank 120, a step of fitting a new lid member 150 and the partition member 140 to each other, and a step of welding the tank 120 and the newly-prepared lid member 150 to each other. The cartridge is produced and reused by such a method. The number of the supporting columns 1911 and 1912 and the number of the holes 1811 and 1812 are not limited to two, and may be one or three or more. The separation step may be executed with the lid member 150 and the partition member 140 fixed to a placing table.

Second Embodiment

Figure 7A:
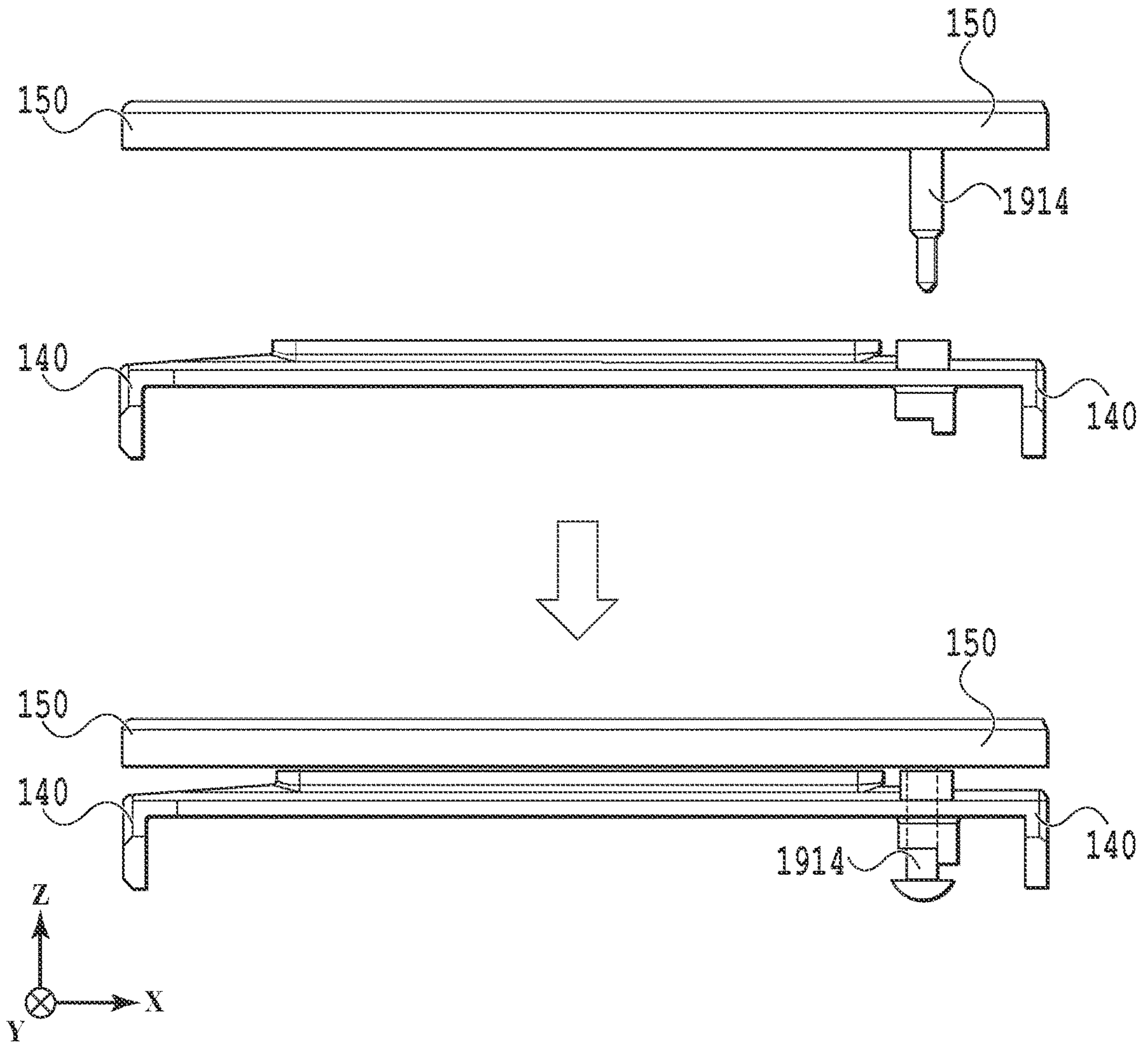
FIGS. 7A and 7B are assembly diagrams of the lid member and the partition member in the case where there is one supporting column.
Figure 7B:
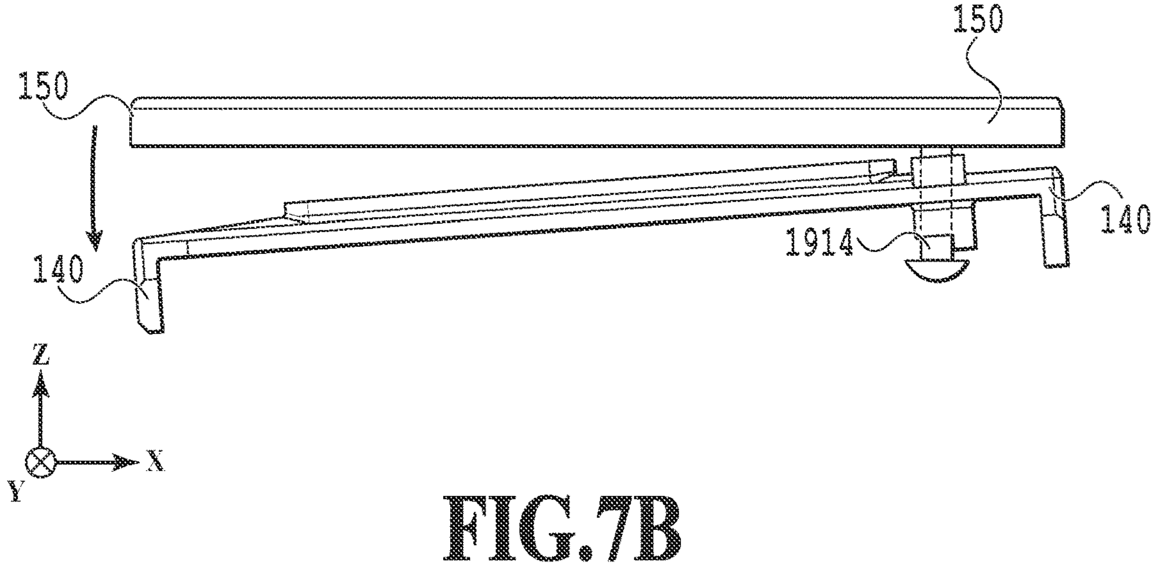

FIGS. 7A and 7B are diagrams in the case where the lid member 150 and the partition member 140 are fixed to each other only at one location. FIG. 7A is a diagram in which the partition member 140 and the lid member 150 including one supporting column 1914 are fixed to each other. In the case where the partition member 140 is fixed by using only one supporting column 1914, as illustrated in FIG. 7B, misalignment such as tilting of the lid member 150 and the partition member 140 occurs.

Figure 8A:
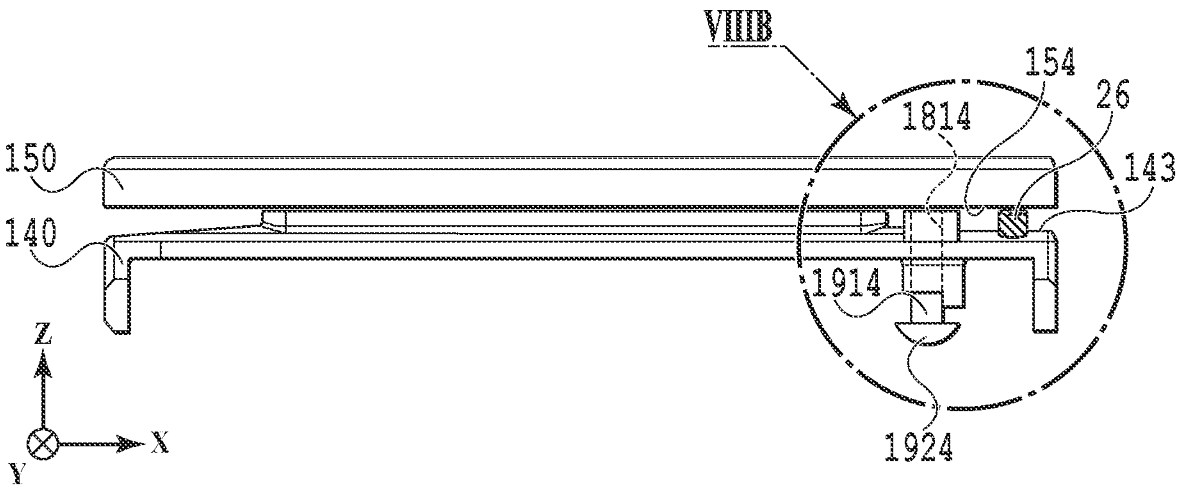
FIGS. 8A and 8B are assembly diagrams of the lid member and the partition member according to a second embodiment.
Figure 8B:
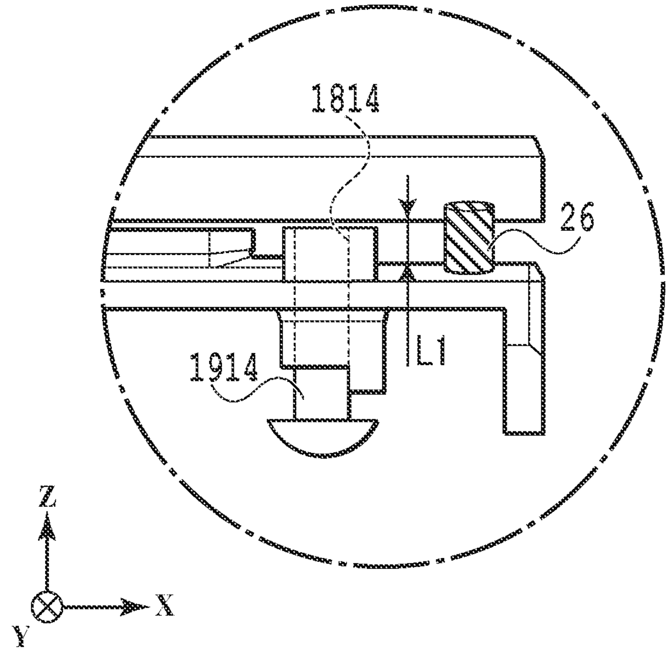

FIG. 8A illustrates the lid member 150 and the partition member 140 according to the second embodiment. FIG. 8B is a detailed diagram of FIG. 8A. In the second embodiment, as illustrated in FIG. 8A, the lid member 150 includes the supporting column 1914, the partition member 140 includes a hole 1814, and a spacer 26 is arranged between the second surface 154 of the lid member 150 and the first surface 143 of the partition member 140. The supporting column 1914 may have a cylindrical shape, and the hole 1814 is a hole penetrating the partition member 140. The spacer 26 is arranged at a position more offset in the direction of the center of gravity of the lid member 150 than the supporting column 1914 is, abuts the lid member 150 and the partition member 140, and defines the interval L1 between the lid member 150 and the partition member 140.

In the second embodiment, the spacer 26 is formed on the second surface 154 of the lid member 150. A fixing portion 1924 is shaped at a tip of the supporting column 1914 with the spacer 26 abutting h the partition member 140 by using a method similar to that in the first embodiment, and the lid member 150 and the partition member 140 are fixed to each other. The spacer 26 supplementarily supports the partition member 140 on the lid member 150, and suppresses rotation of the partition member 140 starting from the position of the hole 1814. Alternatively, the spacer 26 is formed in the partition member 140.

Such a configuration can suppress misalignment of the lid member 150 and the partition member 140 in the case where there is one supporting column. Moreover, such a configuration can easily define the clearance between the lid member 150 and the partition member 140, and facilitate separation of the two components.

Modification Example 1 of Second Embodiment

Figure 9A:
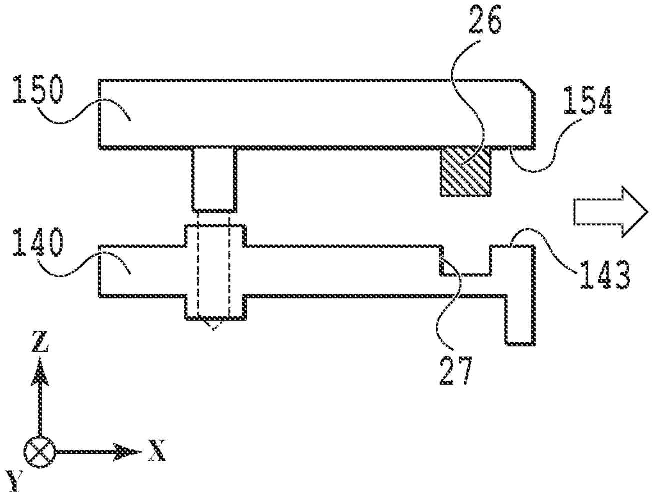
FIGS. 9A and 9B are assembly diagrams of the lid member and the partition member according to Modification Example 1 of the second embodiment.
Figure 9B:
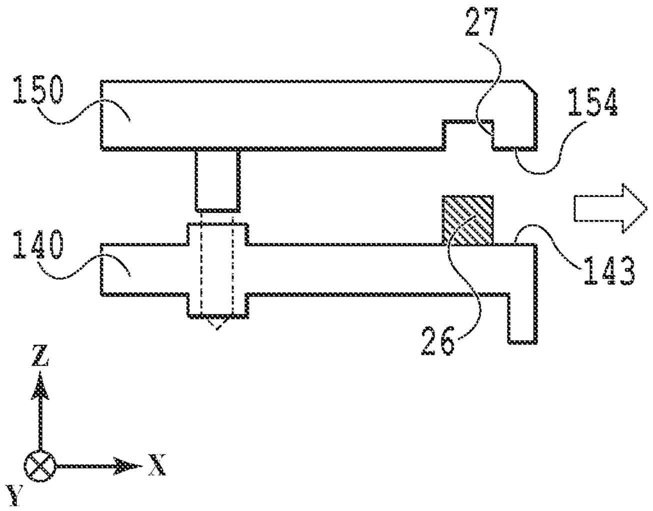

FIGS. 9A and 9B illustrate the lid member 150 and the partition member 140 according to Modification Example 1 of the second embodiment. In Modification Example 1 of the second embodiment, as illustrated in FIG. 9A, the spacer 26 is formed on the second surface 154 of the lid member 150, and a recess portion 27 to be fitted to the spacer 26 is formed on the first surface 143 of the partition member 140 facing the second surface 154. Fitting the spacer 26 and the recess portion 27 to each other in the fixing of the lid member 150 and the partition member 140 suppresses misalignment of the lid member 150 and the partition member 140 in an XY direction. Alternatively, as illustrated in FIG. 9B, the spacer 26 is formed in the partition member 140 and the recess portion 27 is formed in the lid member 150.

Figure 10A:
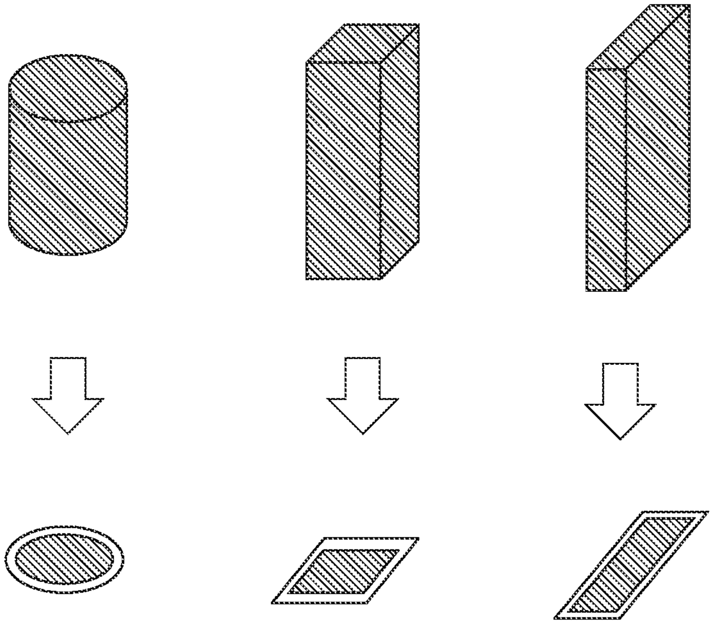
FIGS. 10A and 10B are schematic diagrams of a spacer according to Modification Example 1 of the second embodiment.
Figure 10B:
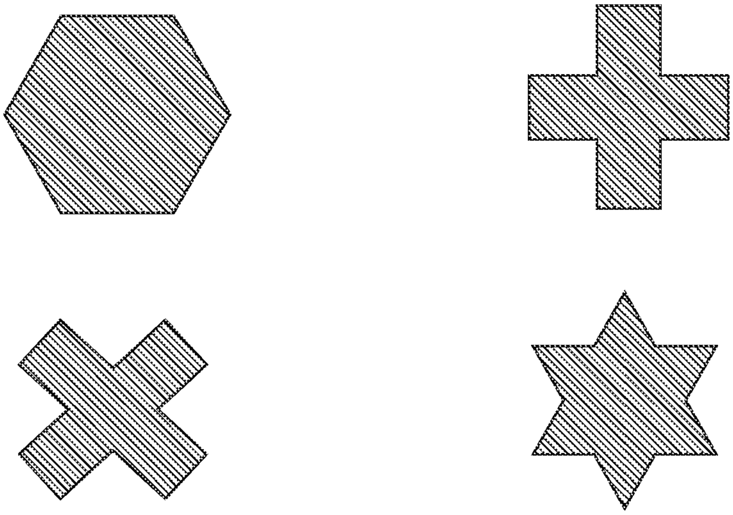

FIG. 10A illustrates alternative shapes of the spacer 26. The shape of the spacer 26 may be a cylinder, a quadrilateral prism, or the like. FIG. 10B illustrates alternative polygonal shapes of the spacer 26. Such configurations increase the area where the spacer 26 and the recess portion 27 are in contact with each other. Accordingly, the spacer 26 and the recess portion 27 are more firmly fixed to each other.

Modification Example 2 of Second Embodiment

Figure 11:
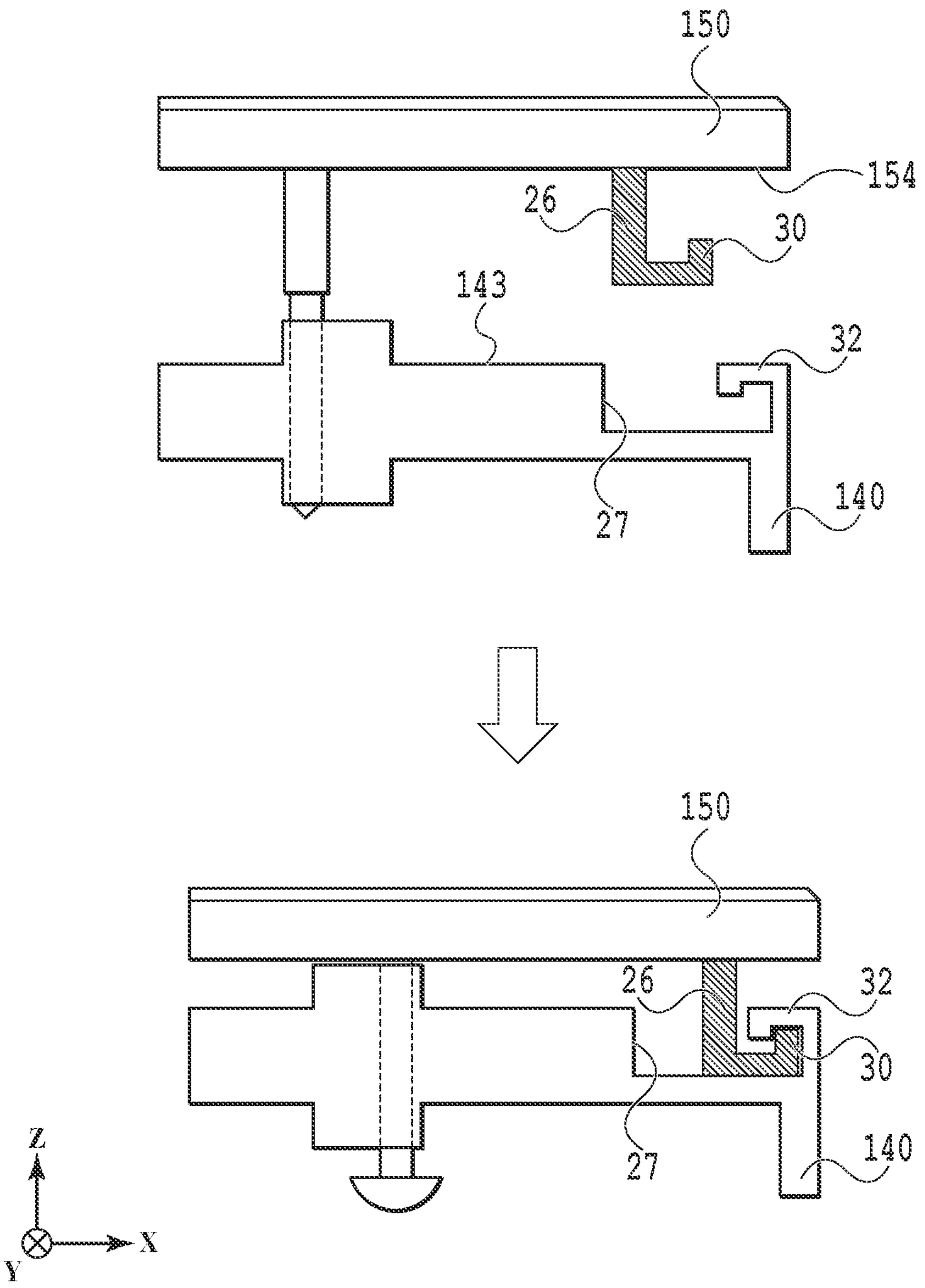
FIG. 11 is an assembly diagram of the lid member and the partition member according to Modification Example 2 of the second embodiment.

FIG. 11 illustrates the lid member 150 and the partition member 140 according to Modification Example 2 of the second embodiment. In Modification Example 2 of the second embodiment, the spacer 26 of the lid member 150 includes a hook-shaped backward-extending portion 30 (first engagement structure). The backward-extending portion 30 is a vertical portion extending from the spacer 26 in a positive Z-axis direction. The recess portion 27 of the partition member 140 includes a backward-extending portion 32 (second engagement structure). The backward-extending portion 32 is a vertical portion extending from the first surface 143 of the partition member 140 in the negative Z-axis direction.

The backward-extending portion 30 and the backward-extending portion 32 can be engaged with each other. In the case where the lid member 150 and the partition member

140 are fixed to each other, the backward-extending portion 30 and the backward-extending portion 32 are engaged with each other, and then the lid member 150 and the partition member 140 are fixed to each other by a method similar to the method described in the first embodiment.

In such a configuration, misalignment of the lid member 150 and the partition member 140 in the Z-axis direction is suppressed. Alternatively, the spacer 26 and the backward-extending portion 30 are formed in the partition member 140, and the recess portion 27 and the backward-extending portion 32 are formed in the lid member 150. The backward-extending portion 32 is a through-hole to which the backward-extending portion 30 is fitted and attached.

Third Embodiment

Figure 12A:
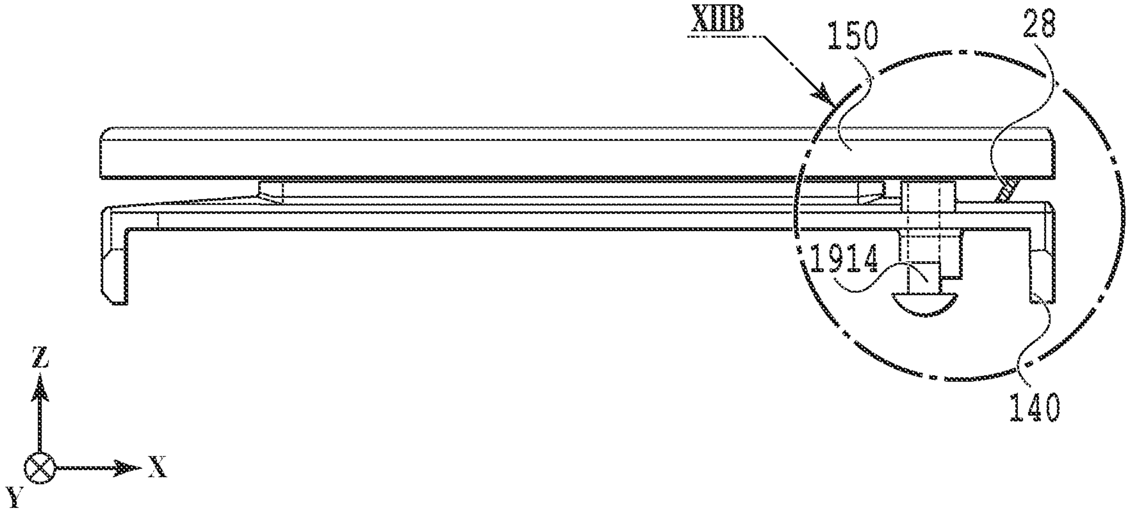
FIGS. 12A and 12B are assembly diagrams of the lid member and the partition member according to a third embodiment.
Figure 12B:
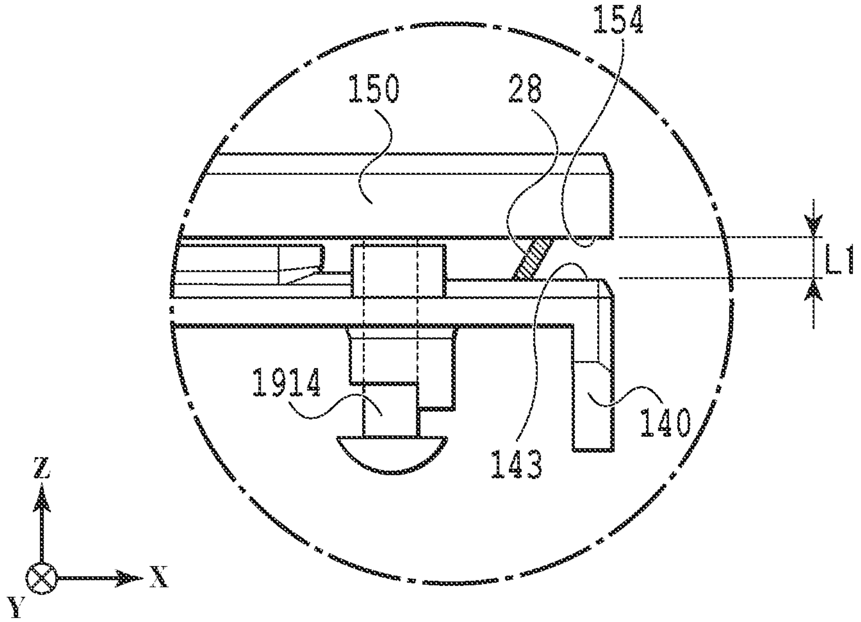

FIGS. 12A and 12B illustrate the lid member 150 and the partition member 140 according to a third embodiment. In the third embodiment, the second surface 154 of the lid member 150 includes the supporting column 1914, the partition member 140 includes the hole 1814, and a tilted spacer 28 is arranged between the second surface 154 of the lid member 150 and the first surface 143 of the partition member 140. The supporting column 1914 has a cylindrical shape, and the hole 1814 is a hole penetrating the partition member 140. The spacer 28 is arranged at a position more offset in the direction of the center of gravity of the lid member 150 than the supporting column 1914 is, abuts the lid member 150 and the partition member 140, and defines the interval L1 between the second surface 154 of the lid member 150 and the first surface 143 of the partition member 140.

In the third embodiment, the spacer 28 is formed on the second surface 154 of the lid member 150. The fixing portion 1924 is shaped at the tip of the supporting column 1914 with the spacer 28 abutting the first surface 143 of the partition member 140 by using a method similar to that in the first embodiment, and the lid member 150 and the partition member 140 are fixed to each other. The spacer 28 supplementarily supports the partition member 140 on the lid member 150, and suppresses rotation of the partition member 140 starting from the position of the hole 1814. Alternatively, the spacer 28 is formed on the first surface 143 of the partition member 140. Such a configuration can suppress misalignment of the lid member 150 and the partition member 140 in the case where there is one supporting column. Moreover, such a configuration can easily define the clearance between the lid member 150 and the partition member 140, and facilitate separation of the two components.

Figure 13:
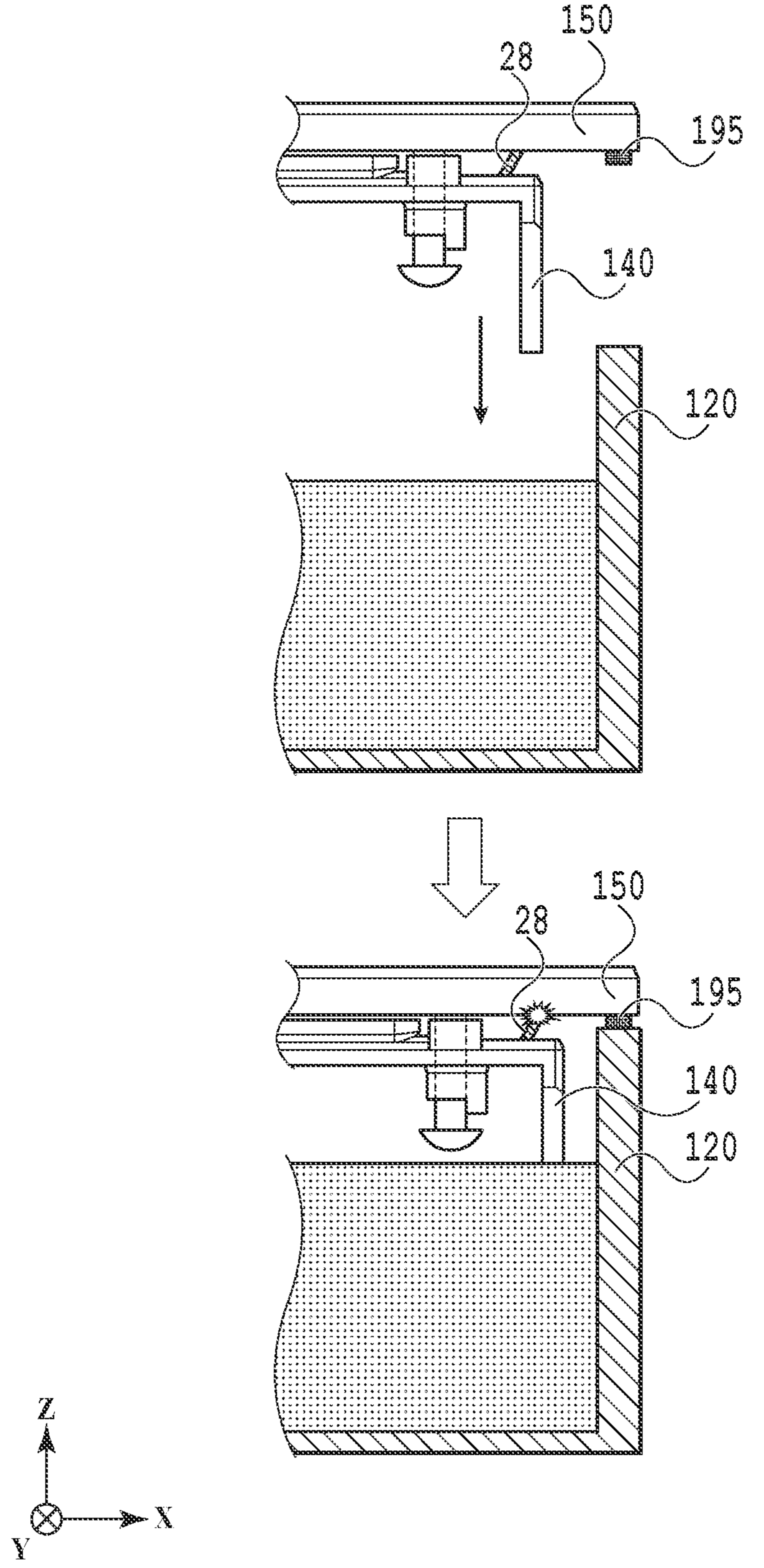
FIG. 13 illustrates a vibration welding step of the lid member and the tank according to the third embodiment.

FIG. 13 illustrates a step of joining the partition member 140 and the lid member 150 including the spacer 28 to the tank 120 according to the third embodiment. The spacer 28 that abuts the lid member 150 and the partition member 140 while being tilted with respect to the lid member 150 and the partition member 140 is compressed by the absorbent 130 and the partition member 140 and breaks in the case where the tank 120 and the lid member 150 are joined by the vibration welding of the welding rib 195. Since the partition member 140 is held by the lid member 150 and the absorbent 130 in the tank 120, the partition member 140 can press the absorbent 130 without trouble even if the spacer 28 breaks.

Figure 14A:
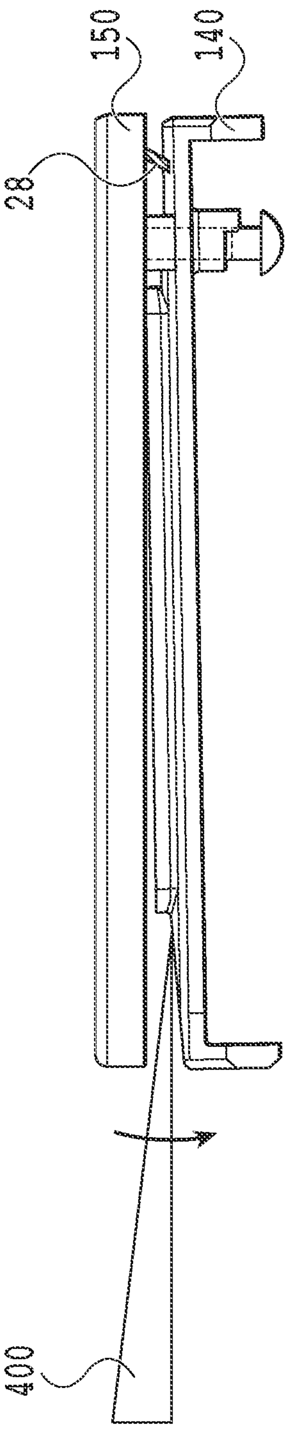
FIGS. 14A and 14B illustrate a separation step of the lid member and the partition member according to the third embodiment.
Figure 14B:
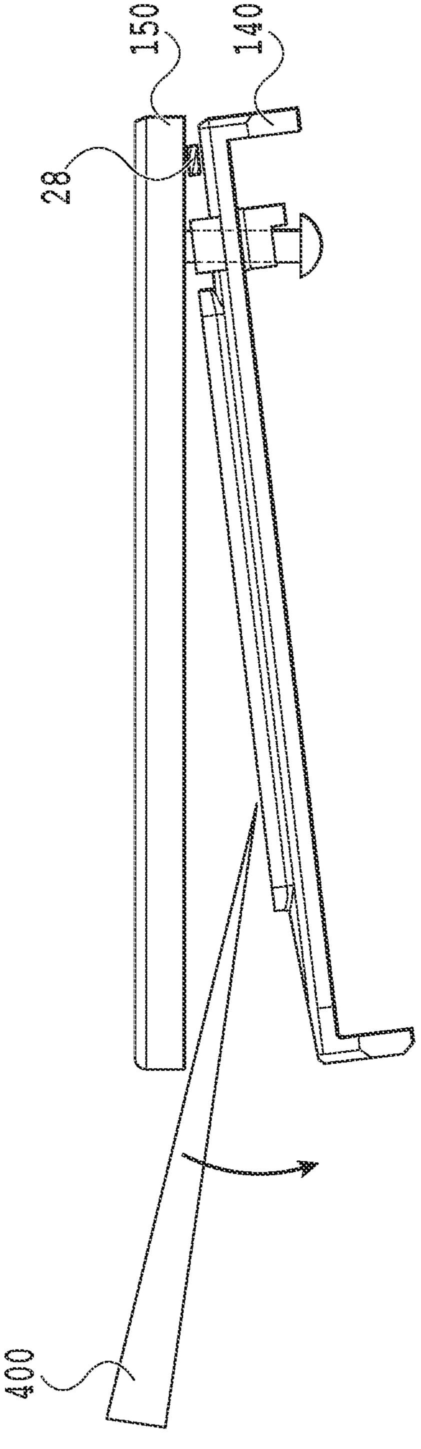

FIGS. 14A to 14B are diagrams in which the lid member 150 and the partition member 140 are separated from each other after removal from the tank 120. The breaking of the spacer 28 facilitates separation of the lid member 150 and the partition member 140 in the case where the lid member 150 and the tank 120 are removed. Forming the spacer 28 in the lid member 150 allows reuse of the partition member 140. The spacer 28 may be formed on each of both sides of the lid member 150. This facilitates defining of the clearance between the lid member 150 and the partition member 140, and facilitates separation of the two components. Alternatively, the spacer 28 is formed in the partition member 140.

Modification Example of Third Embodiment

Figure 15A:
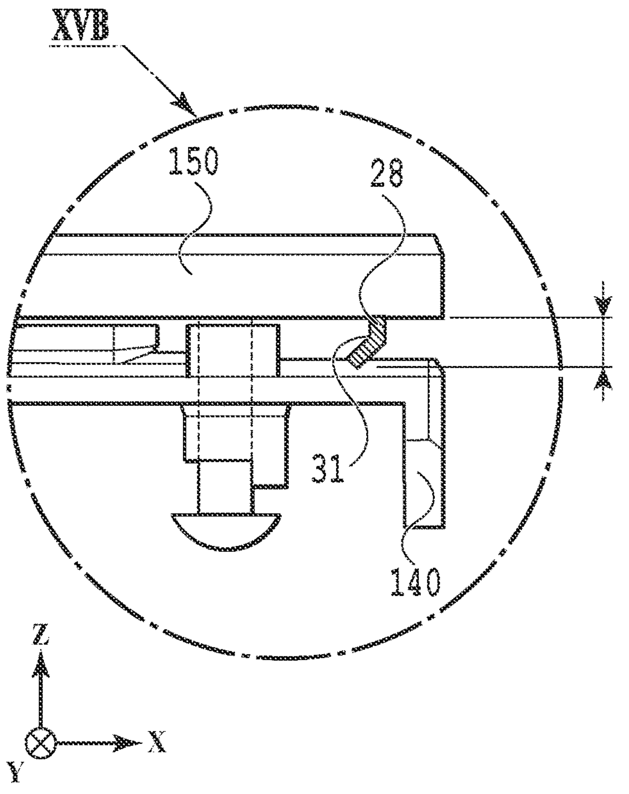
FIGS. 15A and 15B are assembly diagrams of the lid member and the partition member according to a modification example of the third embodiment.
Figure 15B:
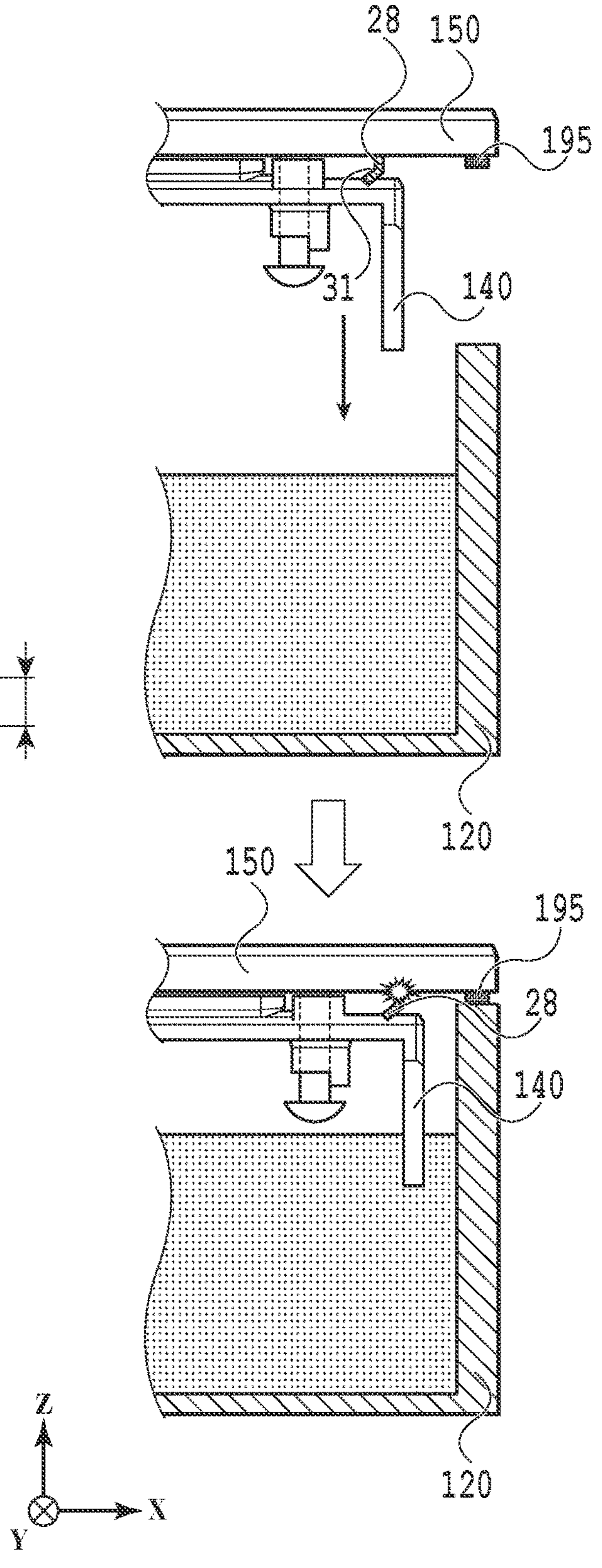

FIG. 15A illustrates the lid member 150 and the partition member 140 according to a modification example of the third embodiment. In the modification example of the third embodiment, the spacer 28 of the lid member 150 includes a bent portion 31. FIG. 15B is a diagram in which the partition member 140 and the lid member 150 including the spacer 28 with the bent portion 31 are vibration-welded to the tank 120. Since the bent portion 31 becomes a starting point of breaking in the case where the tank 120 and the lid member 150 are joined by the vibration welding, breaking of the spacer 28 can be further facilitated. A recess portion, a notch, or the like is formed in the bent portion 31.

Fourth Embodiment

Figure 16A:
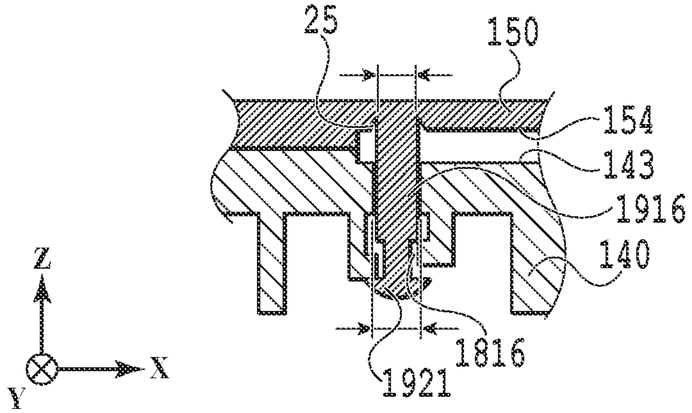
FIGS. 16A to 16D are assembly diagrams of the lid member and the partition member according to a fourth embodiment.

FIG. 16A illustrates the lid member 150 and the partition member 140 according to a fourth embodiment. In the fourth embodiment, the second surface 154 of the lid member 150 includes a supporting column 1916, and the first surface 143 of the partition member 140 includes a hole 1816. The supporting column 1916 may have a cylindrical shape, and the hole 1816 is a hole penetrating the partition member 140. The supporting column 1916 is fixed to the hole 1816 by forming the fixing portion 1921 in a method similar to that in the first embodiment, and the lid member 150 and the partition member 140 are fixed to each other.

As illustrated in FIG. 16A, in the fourth embodiment, the lid member 150 has a groove structure 25 that surrounds the supporting column 1916, on the second surface 154. The groove structure 25 has an inner diameter equal to or smaller than the inner diameter of the hole 1816. The groove structure 25 has a V-shape with a width of 0.2 mm and a depth of 0.5 mm, and surrounds the supporting column 1916 while being located 2.2 mm away from the radial center of the supporting column 1916. The radial center of the supporting column 1916 is located 63 mm away from an adjacent side surface of the lid member 150 extending in the Y-axis direction.

Figure 16B:
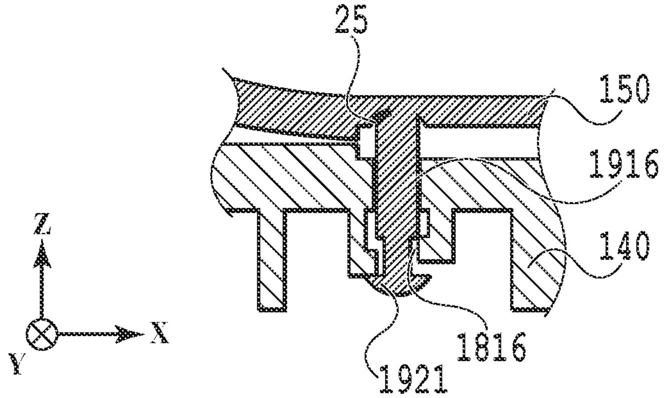
Figure 16C:
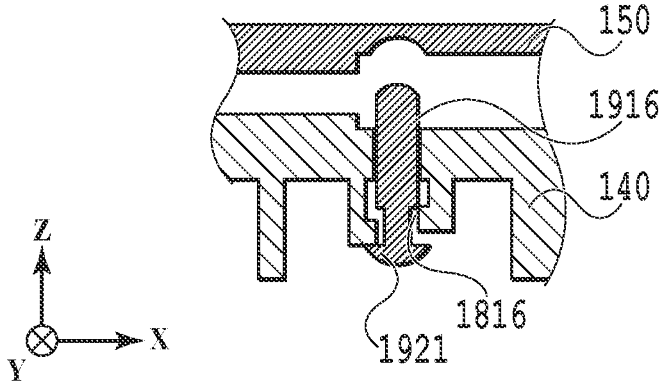
Figure 16D:
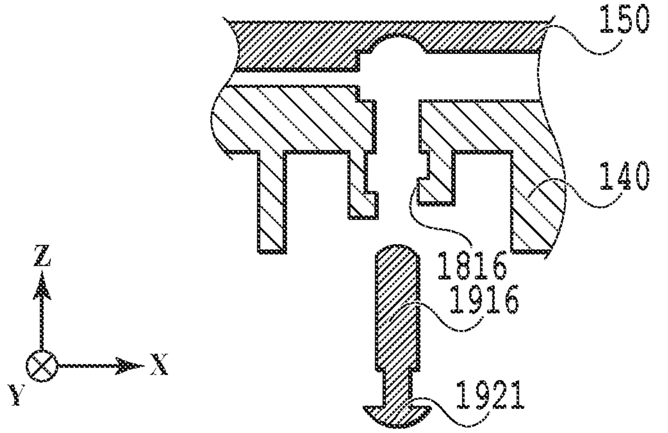

FIGS. 16B to 16D illustrate a separation step of the lid member 150 and the partition member 140 according to the fourth embodiment, and the separation is performed in the order of FIG. 16B, FIG. 16C, and FIG. 16D. In the case where the lid member 150 and the partition member 140 are separated from each other in the Z-axis direction, the hole 1816 of the partition member 140 and the fixing portion 1921 of the supporting column 1916 interfere with each other. In the case where the lid member 150 and the partition member 140 are further separated from each other in the Z-axis direction, the supporting column 1916 receives force in the Z axis direction, the groove structure 25 adjacent to the lid member 150 and the supporting column 1916 becomes a point of load, and the lid member 150 breaks with the groove structure 25 being the starting point. Accordingly, part of the lid member 150 and the supporting column 1916 are separated from the lid member 150. Alternatively, the groove structure 25 is arranged intermittently or partially in a periphery of the supporting column 1916 in the lid member 150.

Modification Example of Fourth Embodiment

Figure 17A:
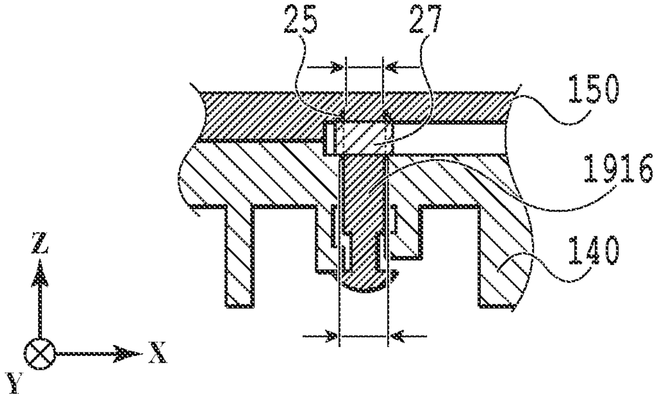
FIGS. 17A to 17D are assembly diagrams of the lid member and the partition member according to a modification example of the fourth embodiment.

FIG. 17A illustrates the lid member 150 and the partition member 140 according to a modification example of the fourth embodiment. In the modification example of the fourth embodiment, a relay member 27 surrounding the supporting column 1916 is arranged between the lid member 150 and the partition member 140. The relay member 27 may have a cylindrical shape, may have a length of 1 mm and an inner diameter of 2.5 mm, and is shaped as a single component or shaped integrally with the partition member 140.

Figure 17B:
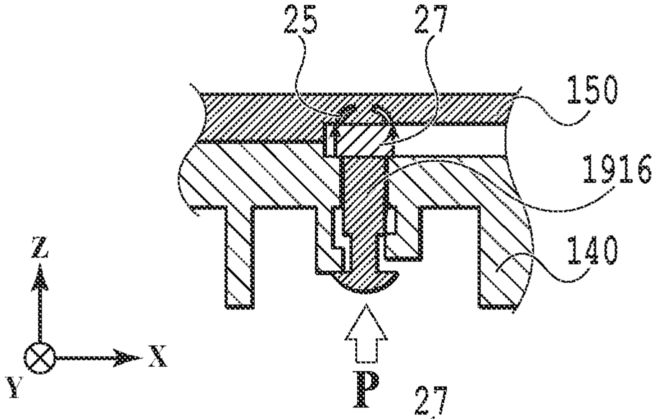
Figure 17C:
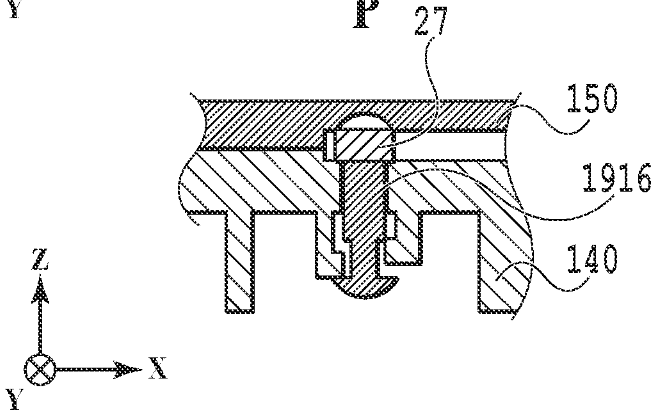
Figure 17D:
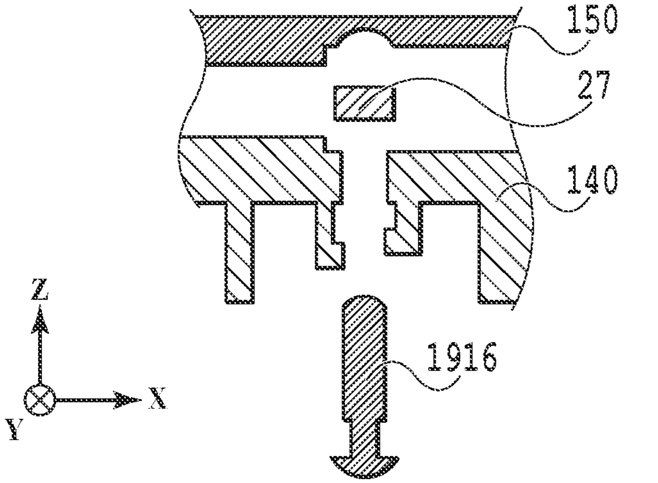

FIGS. 17B to 17D illustrate a separation step of the lid member 150 and the partition member 140 in attachment of the lid member 150 and the tank 120 according to the modification example of the fourth embodiment, and the separation is performed in the order of FIG. 17B, FIG. 17C, and FIG. 17D. In the welding of the lid member 150 to the tank 120, the vibration welding is performed with the lid member 150 pressed against the tank 120 as described above. In this case, as illustrated in FIG. 17B, the rib portions 142 of the partition member 140 abut the absorbent 130, and force P in the positive Z-axis direction in which the partition member 140 pushes the lid member 150 upward acts as reaction force. As illustrated in FIG. 17C, in the case where the force P that the partition member 140 receives from the absorbent 130 is applied to the relay member 27, the relay member 27 pushes the lid member 150 upward. This causes the groove structure 25 to be pushed upward, and the lid member 150 breaks with the groove structure 25 being the starting point. As illustrated in FIG. 17D, the lid member 150 and the partition member 140 are thereby separated from each other in the case where the lid member 150 and the tank 120 are attached.

Fifth Embodiment

Figure 18A:
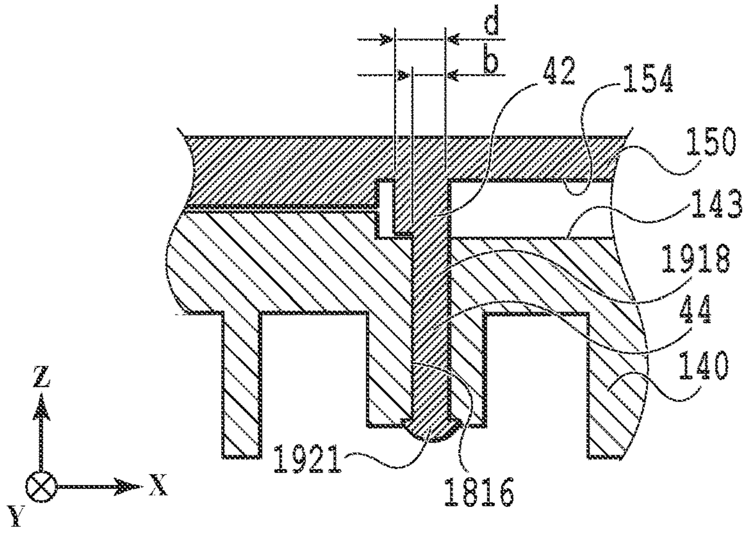
FIGS. 18A to 18C are assembly diagrams of the lid member and the partition member according to a fifth embodiment.

FIG. 18A illustrates the lid member 150 and the partition member 140 according to a fifth embodiment. In the fifth embodiment, the second surface 154 of the lid member 150 includes a supporting column 1918, and the partition member 140 includes the hole 1816. The supporting column 1918 may have a cylindrical shape, includes a first portion 42 with a width a at a first position (proximal portion) of the supporting column 1918, and includes a second portion 44 with a width b smaller than the width a, at a second position (distal portion) of the supporting column 1918. The width b may be half the width a. The position of the second portion 44 in the horizontal direction is preferably a position eccentric to the center of the first portion 42. Moreover, a direction of the eccentricity is preferably such that the second portion 44 is arranged far away from a position of peeling-off in peeling-off of the lid member 150 from the tank 120.

The hole 1816 is a hole penetrating the partition member 140. The inner diameter of the hole 1816 is larger than the width b, and is smaller than the width a. The supporting column 1918 is fixed to the hole 1816 by forming the fixing portion 1921 in a method similar to that in the first embodiment, and the lid member 150 and the partition member 140 are fixed to each other. In the fixing of the lid member 150 and the partition member 140, the first portion 42 of the supporting column 1918 is not inserted into the hole 1816, and the second portion 44 is inserted into the hole 1816 and protrudes from the partition member 140 toward the absorbent holder by about 1.5 mm (dimension c). A tip of the protruding second portion 44 of the supporting column 1918 is shaped into the fixing portion 1921.

Figure 18B:
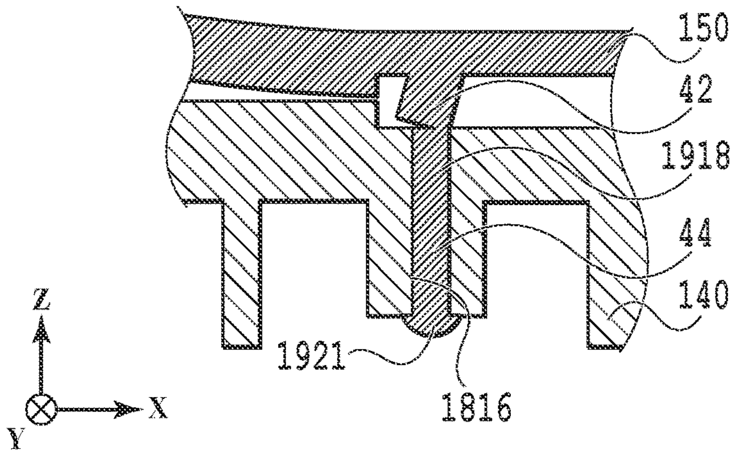
Figure 18C:
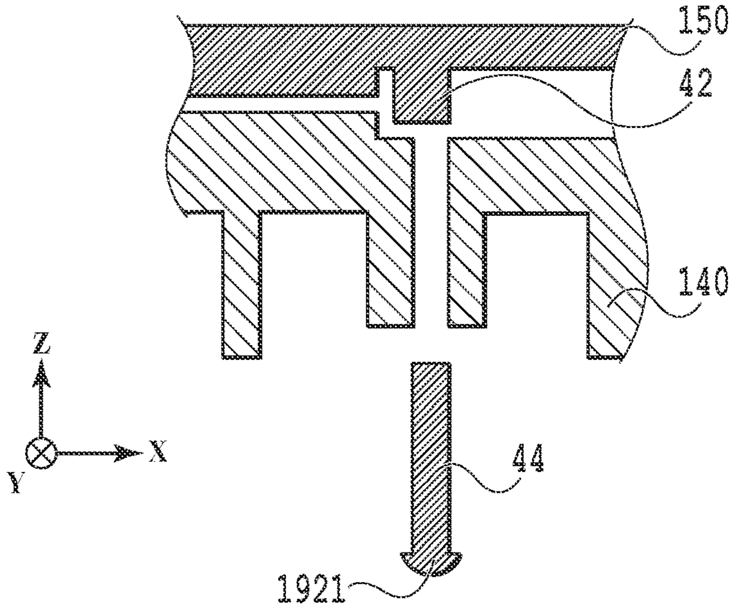

FIGS. 18B to 18C illustrate a separation step of the lid member 150 and the partition member 140 according to the fifth embodiment, and the separation is performed in the order of FIG. 18B and FIG. 18C. As illustrated in FIG. 18B, in the case where the lid member 150 and the partition member 140 are separated from each other in the Z-axis direction, the hole 1816 of the partition member 140 and the second portion 44 of the supporting column 1918 abut each other. As illustrated in FIG. 18C, in the case where the lid member 150 and the partition member 140 are further separated, concentrated stress is applied to a joining portion of the first portion 42 and the second portion 44, and the supporting column 1918 breaks with the joining portion being the starting point.

Modification Example of Fifth Embodiment

Figure 19A:
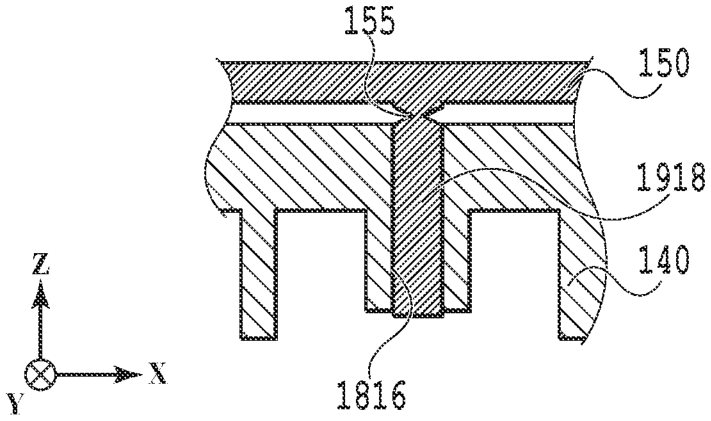
FIGS. 19A to 19C are assembly diagrams of the lid member and the partition member according to a modification example of the fifth embodiment.

FIG. 19A illustrates the lid member 150 and the partition member 140 according to a modification example of the fifth embodiment. In the modification example of the fifth embodiment, the supporting column 1918 has a cylindrical shape, and includes a groove 155 surrounding the supporting column 1918 at the first position of the supporting column 1918. The hole 1816 of the partition member 140 penetrates the partition member 140. Alternatively, the hole 1816 may have a bottom section, that is may not penetrate the partition member 140.

In the modification example of the fifth embodiment, an inner wall of the hole 1816 of the partition member 140 includes a narrow portion having such a dimension that the narrow portion is engaged with the supporting column 1918 by friction. The narrow portion is engaged with the supporting column 1918 by friction force. The dimension of the supporting column 1918 in the Z-axis direction is such a dimension that the supporting column 1918 does not protrude from the partition member 140 in the case where the lid member 150 and the partition member 140 are fixed to each other.

Figure 19B:
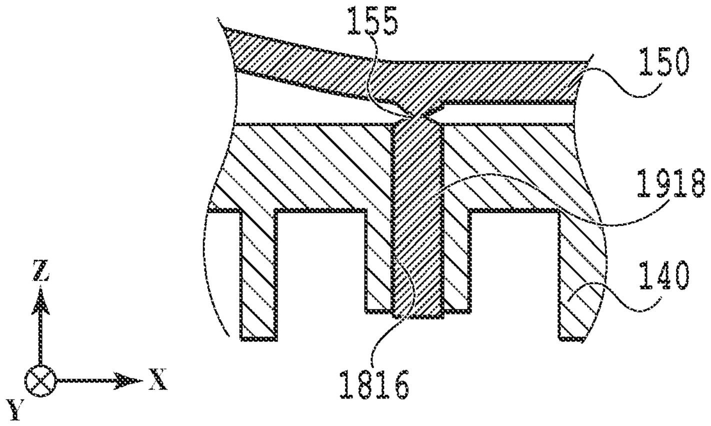
Figure 19C:
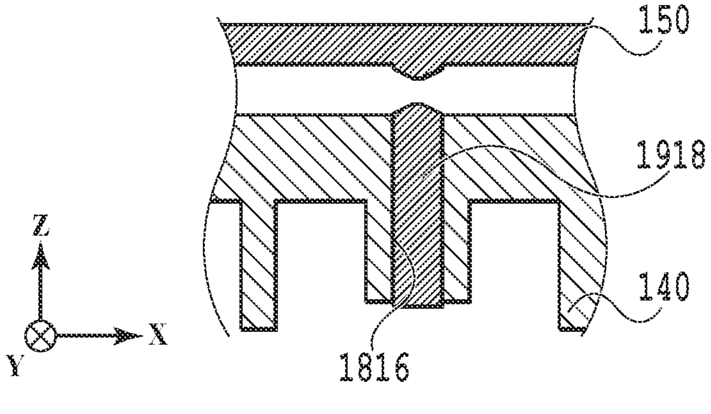

FIGS. 19B to 19C illustrate a separation step of the lid member 150 and the partition member 140 according to the modification example of the fifth embodiment, and the separation is performed in the order of FIG. 19B and FIG. 19C. As illustrated in FIG. 19B, in the case where the lid member 150 and the partition member 140 are separated from each other in the Z-axis direction, concentrated stress is applied to the groove 155 of the supporting column 1918, and as illustrated in FIG. 19C, the supporting column 1918 breaks with the groove 155 being the starting point.

Alternatively, in the first to fifth embodiments, the number of supporting columns and the number of holes may each be one, and the hole is arranged at the center of gravity of the partition member 140. An outer periphery of the surface of the partition member 140 facing the lid member 150 may be spaced away from the lid member 150, and for example, have a shape tapered toward the outer side.

Sixth Embodiment

Figure 20A:
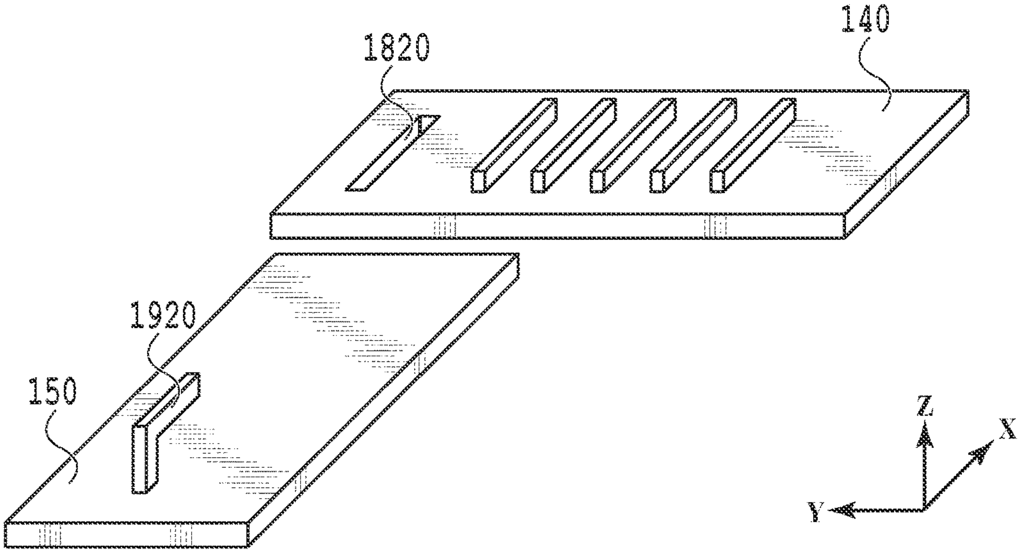
FIGS. 20A to 20C are assembly diagrams of the lid member and the partition member according to a sixth embodiment.

FIG. 20A illustrates the lid member 150 and the partition member 140 according to a sixth embodiment. In the sixth embodiment, the lid member 150 includes a key portion 1920 extending in a first predetermined direction on an XY plane of the lid member 150. The partition member 140 includes a hole 1820 extending in a second predetermined direction on an XY plane of the partition member 140. FIG. 20A is a diagram in which the partition member 140 is rotated 90°. The first predetermined direction and the second predetermined direction are orthogonal to each other, but are various relative angles. The hole 1820 is arranged at a position about 5 mm away from an end of the partition member 140 parallel to the longitudinal direction of the hole 1820.

Figure 20B:
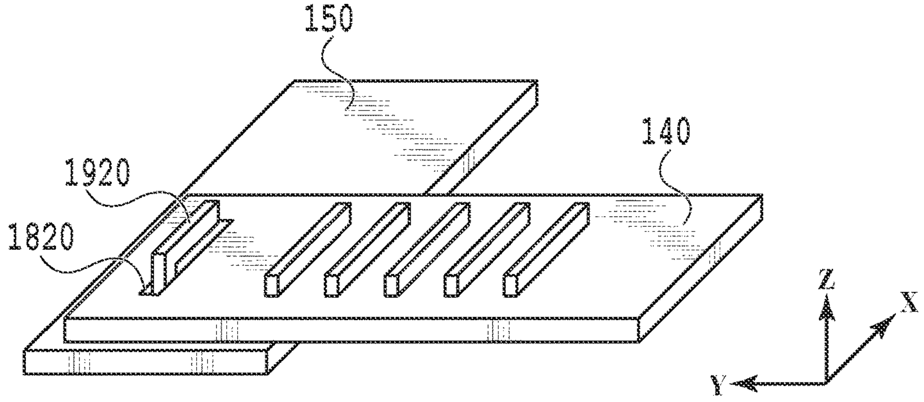
Figure 20C:
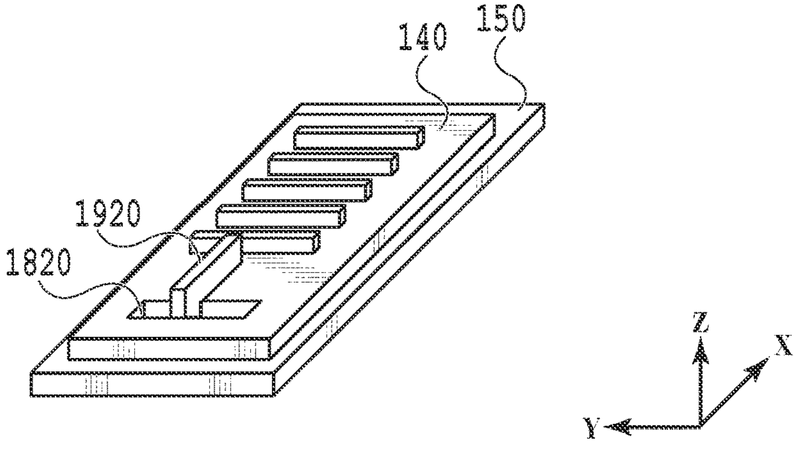

FIGS. 20B to 20C illustrate an assembly step of the lid member 150 and the partition member 140 according to the sixth embodiment. As illustrated in FIG. 20B, the key portion 1920 and the hole 1820 intersect or are orthogonal to each other, and the key portion 1920 is inserted into the hole 1820, and is preferably rotated 90 degrees about an axis in the Z-axis direction. As illustrated in FIG. 20C, the key portion 1920 and the hole 1820 are thereby engaged with each other, and the lid member 150 and the partition member 140 are fixed to each other.

After the assembly of the lid member 150 and the partition member 140, the lid member 150 is fixed to the tank 120 in a method similar to that in the first embodiment. In such a configuration, in the separation of the lid member 150 and the partition member 140 after usage of the cartridge, the engagement can be cancelled by rotating the lid member 150 and the partition member 140 relative to each other in a direction opposite to that in the assembly.

Modification Example 1 of Sixth Embodiment

Figure 21A:
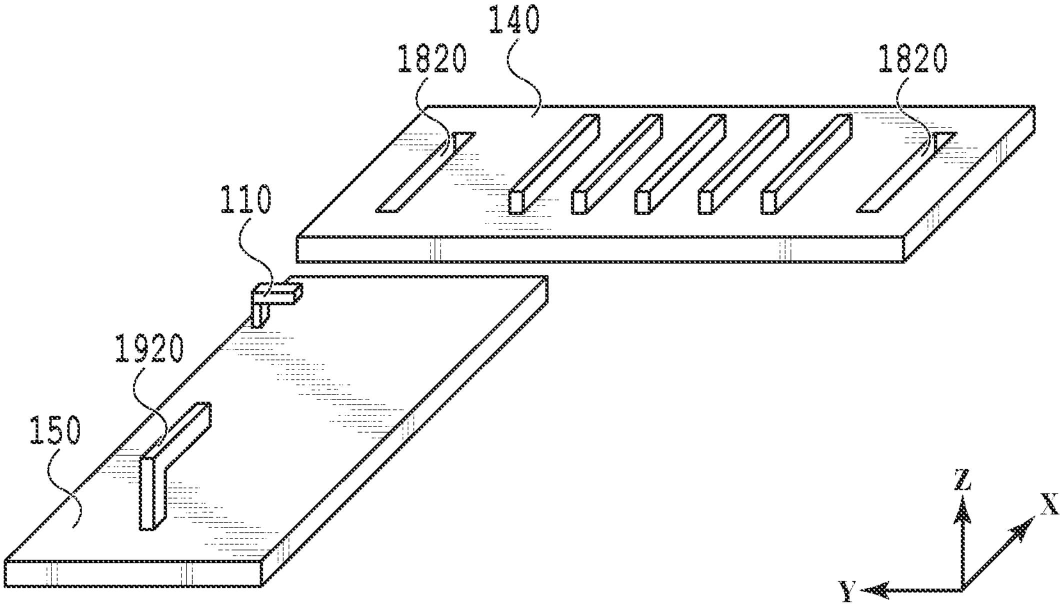
FIGS. 21A and 21B are assembly diagrams of the lid member and the partition member according to Modification Example 1 of the sixth embodiment.
Figure 21B:
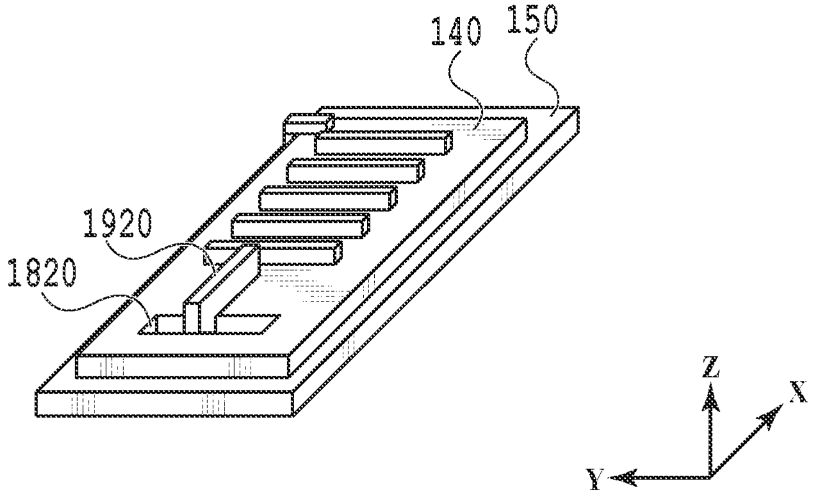

FIGS. 21A and 21B illustrate the lid member 150 and the partition member 140 according to Modification Example 1 of the sixth embodiment. FIG. 21A illustrates the lid member 150 and the partition member 140 before engagement, and FIG. 21B illustrates the lid member 150 and the partition member 140 after the engagement. FIG. 21A is a diagram in which the partition member 140 is rotated 90°. In Modification Example 1 of the sixth embodiment before the engagement, the lid member 150 includes a supplementary protrusion 110 on the same plane as the key portion 1920. Two or more holes 1820 may be provided, and are arranged point symmetric to each other on a plane of the partition member 140. In the case where the lid member 150 and the partition member 140 are engaged with each other by being rotated as in the sixth embodiment, the supplementary protrusion 110 is engaged with the partition member 140.

In Modification Example 1 of the sixth embodiment, part of the key portion 1920 may be left in the hole 1820 in the separation of the lid member 150 and the partition member 140. This configuration suppresses usage of the previously-used hole 1820 in reuse of the partition member 140. As described above, a structure in which part of the key portion 1920 is left in the hole 1820 is employed to enable determination of the number of times of usage in recycling.

Modification Example 2 of Sixth Embodiment

Figure 22A:
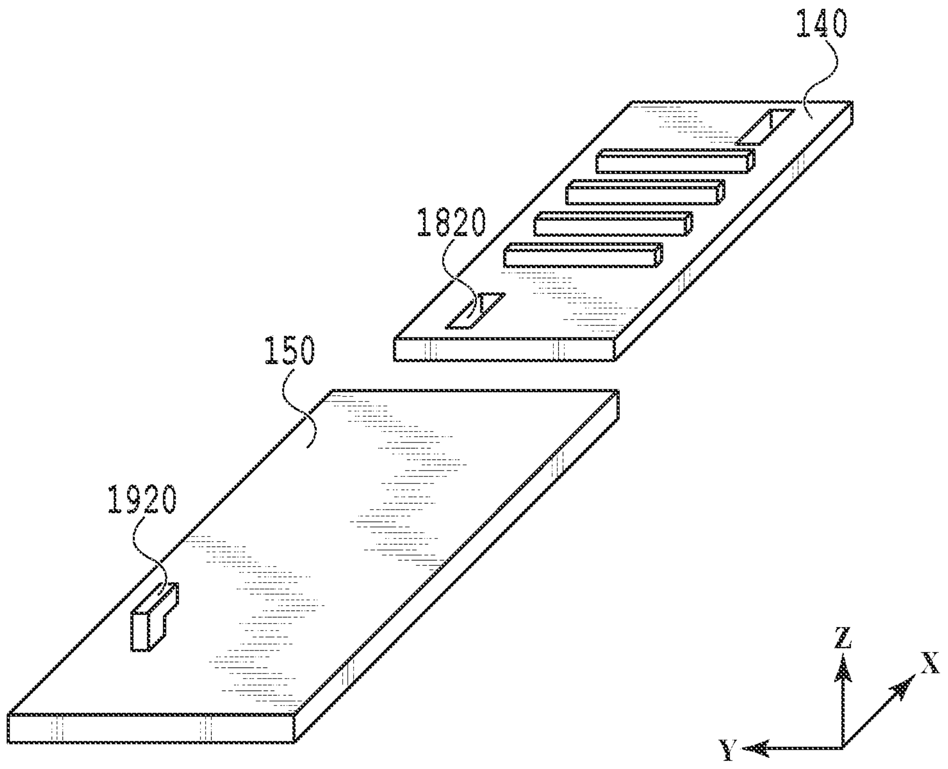
FIGS. 22A and 22B are assembly diagrams of the lid member and the partition member according to Modification Example 2 of the sixth embodiment.
Figure 22B:
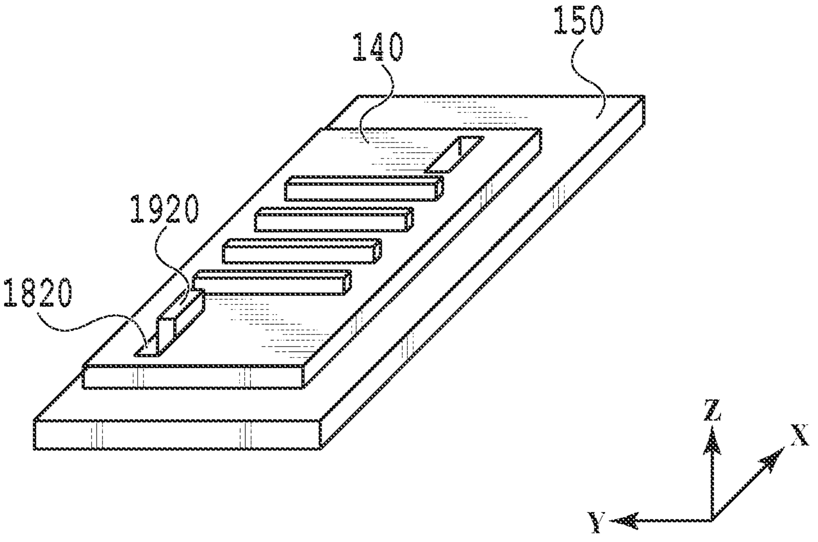

FIGS. 22A and 22B illustrate the lid member 150 and the partition member 140 according to Modification Example 2 of the sixth embodiment. FIG. 22A illustrates the lid member 150 and the partition member 140 before engagement, and FIG. 22B illustrates the lid member 150 and the partition member 140 after the engagement. In Modification Example 2 of the sixth embodiment, the lid member 150 includes the key portion 1920 extending in the first predetermined direction on the XY plane of the lid member 150, and the partition member 140 includes the hole 1820 extending in the first predetermined direction on the XY plane of the partition member 140. The arrangement and length of the key hole in the longitudinal direction are preferably such that, in the case where the key portion 1920 and the hole 1820 are engaged with each other, the partition member 140 becomes the symmetry center with respect to the lid member 150. The size of the partition member 140 is determined in consideration of effects of misalignment and the necessary size of the rib portions 142 with respect to the lid member.

The key portion 1920 and the hole 1820 are parallel to each other, the key portion 1920 is inserted into the hole 1820, and the lid member 150 and the partition member 140 are made to slide relative to each other to engage the key portion 1920 and the hole 1820 to each other, and the lid member 150 and the partition member 140 are fixed to each other.

Although explained in the first embodiment, the reusing method is explained again. The partition member 140 is separated and reused to be incorporated into a next product. The method of reusing the partition member 140 includes the step of peeling off the lid member 150 from the tank 120, the step of separating the lid member 150 and the partition member 140 from each other, the step of replacing the absorbent 130, and the step of cleaning the inside of the tank 120. The method of reusing the partition member 140 includes the step of inserting the new absorbent 130 into the tank 120 and injecting liquid, the step of fitting the new lid member 150 and the partition member 140 to each other, and the step of welding the new lid member 150 and the tank 120 to each other. The cartridge is produced and reused by the method described above.

In any of the embodiments, as exemplar dimensions, the lid member 150 may have a dimension of 75 mm in the X direction, a dimension of 21 mm in the Y direction, and a dimension of 3 mm in the Z-axis direction. Each supporting column may be a cylinder with a diameter of 2 mm and a height of 8 mm. The partition member 140 may have a dimension of 63 mm in the X direction, a dimension of 9 mm in the Y direction, and a dimension of 2 to 7 mm in the Z-axis direction including the rib portions 142. The shape of the partition member 140 is an elongated shape, and an aspect ratio that is a width-to-height ratio (ratio of length and width in this case) of the partition member 140 may be 1:4, preferably a dimension of the shorter side is 15.2 mm and a dimension of the longer side is 64 mm. The inner diameter of the hole through which the supporting column 1916 is passed may be 2.5 mm. In any of the embodiments, the supporting column may be capable of pressing the absorbent in the tank 120 together with the rib portions 142 after the fixation of the lid member 150 to the tank 120. The cartridge 100 of the present disclosure does not have to be a head integrated type cartridge.

Reusing Method of First Embodiment

Figure 23:
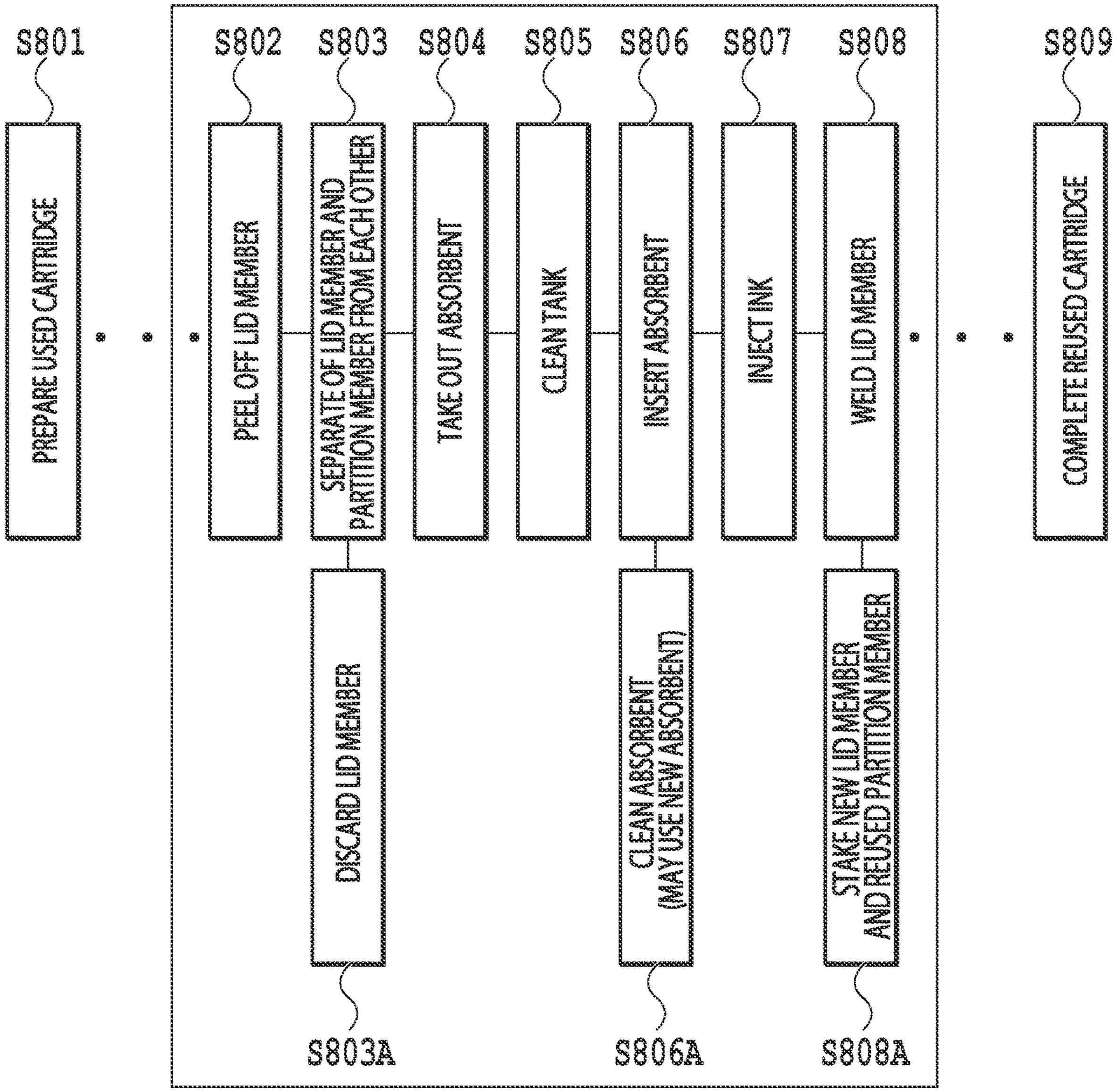
FIG. 23 is a flowchart illustrating a reusing step of the cartridge of the printing apparatus according to the first embodiment.

The reusing method of the cartridge in the present embodiment according to present disclosure is explained by using FIG. 23. Since the steps of reusing the cartridge in the present embodiment are a lid member peeling-off step S802 of peeling off the lid member 150 from the cartridge 100 to a lid member welding step of welding the lid member 150, these steps are explained in detail. FIG. 10 is a diagram obtained by extracting the lid member peeling-off step to the lid member welding step from a cartridge reusing step flow.

The cartridge reusing steps start from step S801 in which the used cartridge 100 is prepared. Next, outer appearance check of the cartridge, cleaning of the exterior, and the like are performed, and then the flow enters the lid member peeling-off step S802 of peeling off the lid member 150. In this step, the lid member 150 is moved relative to the tank 120 to be peeled off. Then, the flow proceeds to a separation step S803 of the lid member 150 and the partition member 140. In the separation step S803, since the lid member 150 and the partition member 140 are integrated to each other by staking, the lid member 150 and the partition member are separated from each other. The fixing by the staking is fixing of such a level that the members can be easily separated from each other as described above. Accordingly, the partition member 140 can be separated by being relatively peeled off from the lid member 150. The separated lid member 150 is discarded, and the partition member 140 is reused. Then, the flow proceeds to an absorbent take-out step S804, and the absorbent 130 depleted of ink is taken out from the tank 120. Next, the flow proceeds to a tank cleaning step S805. In the tank cleaning step S805, the inside of the tank 120 is cleaned. Then, the flow proceeds to an absorbent insertion step S806. In the absorbent insertion step S806, a cleaned absorbent (S806A) obtained by cleaning the absorbent 130 taken out in the absorbent take-out step S804 may be inserted into the tank 120. Alternatively, in the absorbent insertion step S806, a new absorbent may be inserted into the tank. In an absorbent cleaning step S806A, the absorbent 130 is cleaned not only by causing cleaning liquid to permeate from one direction and be discharged by suction but also by immersing the entire absorbent 130 in the cleaning liquid to thoroughly soak the absorbent 130 with the cleaning liquid. Moreover, since the absorbent 130 can be cleaned also by being pressed and deformed in the cleaning liquid, the remaining ink can be cleanly eliminated. After the absorbent insertion step S806, the flow proceeds to an ink injection step S807, and the ink is injected into the tank 120 while being made to soak into the absorbent 130 with a syringe or the like. Then, the flow proceeds to the lid member welding step S808. Before this step, in order to improve a handling property, a step S808A of heat-staking the lid member 150 and the partition member 140 is performed as described above. In the staking step S808A, the heat staking is performed by using a new lid member 150 and by using the partition member 140 separated in the separation step S803 as the partition member 140. Also in the heat staking of this step, the staking is performed at such a level that the lid member 150 can be easily peeled off by hand in consideration of future reuse. This part obtained by integrating the lid member 150 and the partition member 140 is placed on the absorbent, and the lid member welding step S808 is performed. Since the lid member 150 is new, welding in which tightness is secured is possible. Steps hereafter include print inspection, wrapping, and the like, and then the flow proceeds to completion S809 of the reused cartridge.

In the case of the cartridge for the black ink in the present embodiment described above, the weight of the lid member 150 in the total weight of the cartridge including no ink is about 13%, and the weight of the partition member 140 is about 11%. In the case where the lid member 150 is discarded and the partition member 140 is reused, the reuse rate is about 87%. In the case of a lid of a type of a comparative example in which the lid member 150 and the partition member 140 are integral, the weight of the lid is about 19%. Accordingly, the reuse rate is 81% if the lid is discarded. Since the lid member 150 is a substantially-flat plate-shaped component, the weight of the component that needs to be discarded can be suppressed to minimum, and the reuse rate can be improved from that of the lid of the comparative example.

Figure 24B:
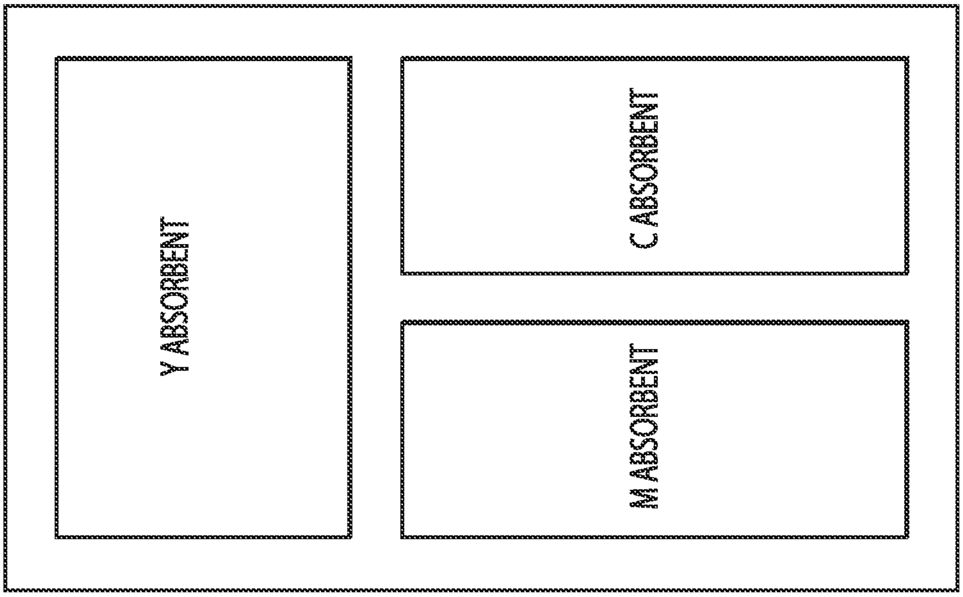
FIGS. 24A and 24B are exemplar diagrams of ink tanks with different shapes.
Figure 24A:
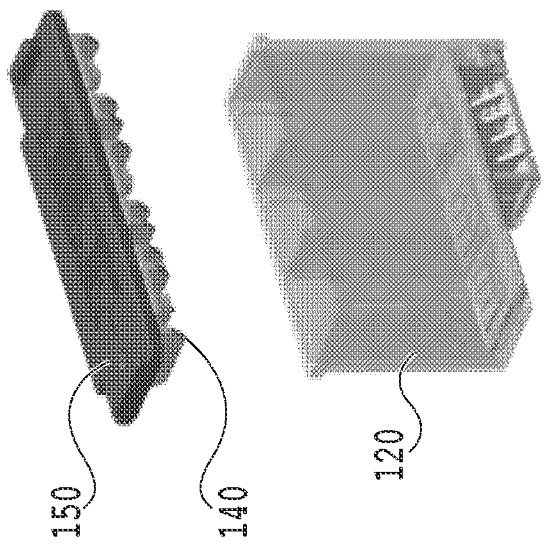

The structure, fixing method, separation method, and reusing method of the lid member 150 and the partition member 140 in the embodiments of the present disclosure can be applied to the tank 120 of any shape. For example, the structure, fixing method, separation method, and reusing method of the present disclosure can be applied to a cartridge that is illustrated in FIG. 24A and that has a configuration in which the tank 120 includes multiple absorbent holders. Moreover, the structure, fixing method, separation method, and reusing method of the present disclosure can be applied to a configuration that is illustrated in FIG. 24B and in which the tank 120 is divided into three sections by a T-shaped wall extending along the Z-axis direction and the absorbents are arranged in parts of the absorbent holder.

The technologies described in this specification have the potential to contribute to the achievement of a sustainable society, such as a decarbonized society/circular society.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2023-066436, filed Apr. 14, 2023, and No. 2024-031412, filed Mar. 1, 2024, which are hereby incorporated by reference wherein in their entirety.

What is claimed is:

1. A cartridge comprising:
- an absorbent configured to hold liquid;
- a tank including an opening and an absorbent holder configured to accommodate the absorbent;
- a lid member joined to the opening of the tank;
- a partition member arranged between the lid member and the absorbent located in the absorbent holder; and
- at least one spacer between the lid member and the partition member, wherein
- the lid member includes a first engagement portion,
- the partition member includes a second engagement portion,
- the first engagement portion and the second engagement portion are engaged with each other,
- parts of outer peripheries of surfaces of the lid member and the partition member facing each other have an interval therebetween in an overlapping direction in which the lid member and the partition member overlap each other, and
- one of the lid member and the partition member that faces the lid member or the partition member in which the spacer is arranged has a recess portion that receives the spacer.

2. The cartridge according to claim 1, wherein
- the first engagement portion is a supporting column that protrudes from the lid member toward the partition member, and
- the second engagement portion is a hole that penetrates the partition member and that receives the supporting column.

3. The cartridge according to claim 2, wherein the supporting column protrudes toward the absorbent holder, beyond the partition member.

4. The cartridge according to claim 3, wherein
- the supporting column has a shape tapered in a direction away from the lid member, and
- a diameter of the hole is smaller than an outer diameter at a first position in the supporting column, and is larger than an outer diameter at a second position in the supporting column, the second position located in the direction away from the lid member, from the first position.

5. The cartridge according to claim 2, wherein the spacer is arranged in the lid member or the partition member, and is arranged at a position farther away from a center of the gravity of the lid member than the supporting column is.

6. The cartridge according to claim 5, wherein the number of the supporting column is one.

7. The cartridge according to claim 2, wherein the lid member includes a groove at a position corresponding to the supporting column.

8. The cartridge according to claim 7, further comprising a relay member that is arranged between the lid member and the partition member and that surrounds the supporting column.

9. The cartridge according to claim 1, wherein the spacer includes a first engagement structure, the recess portion includes a second engagement structure, and the first engagement structure and the second engagement structure are engaged with each other.

10. The cartridge according to claim 9, wherein the first engagement structure is a backward-extending portion, and the second engagement structure is a backward-extending portion.

11. The cartridge according to claim 1, wherein the spacer is tilted with respect to the lid member and the partition member.

12. The cartridge according to claim 11, wherein the supporting column has a first position adjacent to the lid member and a second position extending from the lid member, an outer diameter of the first position corresponds to a hole in the partition member, and an outer diameter of the second position is larger than an inner diameter of the hole in the partition member.

13. The cartridge according to claim 11, wherein the hole has a bottom section and a narrow portion, an inner diameter of the narrow portion is smaller than a diameter of the supporting column, and the hole is engaged with the supporting column by friction force.

14. The cartridge according to claim 1, wherein the outer periphery of the surface of the lid member facing the partition member is spaced away from the partition member.

15. A cartridge comprising:

an absorbent configured to hold liquid;

a tank including an opening and an absorbent holder configured to accommodate the absorbent;

a lid member joined to the opening of the tank; and a partition member arranged between the lid member and the absorbent located in the absorbent holder, wherein the lid member includes a key portion extending along a plane forming the lid member, the partition member includes a hole extending along the plane, and the key portion and the hole are engaged with each other.

16. The cartridge according to claim 15, wherein the key portion extends in a predetermined direction of the plane, the hole extends in a direction intersecting the predetermined direction, and a width of the hole in the predetermined direction is shorter than a length of the key portion in the predetermined direction.

17. The cartridge according to claim 15, wherein the lid member includes a supplementary protrusion on the same plane as the key portion, and the supplementary protrusion is adjacent to a side surface of the partition member.

18. A reusing method of a cartridge comprising:

preparing a cartridge that includes an absorbent configured to hold liquid, a tank including an opening and an absorbent holder configured to accommodate the absorbent, a lid member joined to the opening of the tank, and a partition member arranged between the lid member and the absorbent located in the absorbent holder and in which the lid member includes a first engagement portion, the partition member includes a second engagement portion, the first engagement portion and the second engagement portion are engaged with each other, and parts of outer peripheries of surfaces of the lid member and the partition member facing each other have an interval therebetween in an overlapping direction in which the lid member and the partition member overlap each other;

peeling-off the lid member from the tank;

separating the lid member and the partition member from each other;

removing the absorbent;

cleaning an inside of the tank;

inserting a new absorbent in the tank and injecting the liquid;

fitting a new lid member and the partition member to each other; and welding the new lid member and the tank to each other.

* * * * *